(12) United States Patent
Yamanaka et al.

(10) Patent No.: US 12,106,680 B2
(45) Date of Patent: Oct. 1, 2024

(54) HEART MODEL

(71) Applicant: ASAHI INTECC CO., LTD., Seto (JP)

(72) Inventors: Nobuyoshi Yamanaka, Seto (JP);
Satoshi Namima, Seto (JP); Masakazu Nakada, Seto (JP)

(73) Assignee: ASAHI INTECC CO., LTD., Seto (JP)

( * ) Notice: Subject to any disclaimer, the term of this patent is extended or adjusted under 35 U.S.C. 154(b) by 679 days.

(21) Appl. No.: 17/319,092

(22) Filed: May 13, 2021

(65) Prior Publication Data

US 2021/0272479 A1    Sep. 2, 2021

Related U.S. Application Data

(63) Continuation of application No. PCT/JP2018/044350, filed on Dec. 3, 2018.

(51) Int. Cl.
*G09B 23/32* (2006.01)
*G09B 23/30* (2006.01)

(52) U.S. Cl.
CPC .......... *G09B 23/303* (2013.01); *G09B 23/32* (2013.01)

(58) Field of Classification Search
CPC ......... G09B 23/28; G09B 23/30; G09B 23/32
See application file for complete search history.

(56) References Cited

U.S. PATENT DOCUMENTS

| 6,234,804 B1* | 5/2001 | Yong | G09B 23/34 434/274 |
| 10,283,016 B2* | 5/2019 | Watanabe | G09B 23/285 |
| 2002/0061503 A1* | 5/2002 | Chamberlain | G09B 23/288 434/267 |
| 2010/0167251 A1* | 7/2010 | Boutchko | A61B 5/055 434/267 |

FOREIGN PATENT DOCUMENTS

| CN | 104658395 A | 5/2015 |
| JP | 2003-536107 A | 12/2003 |
| JP | 2004-508589 A | 3/2004 |
| JP | 2007-333781 A | 12/2007 |
| WO | 01/95293 A2 | 12/2001 |
| WO | 02/021483 A1 | 3/2002 |
| WO | 2008/151202 A2 | 12/2008 |

OTHER PUBLICATIONS

International Search Report and Written Opinion mailed on Feb. 12, 2019, received for PCT Application PCT/JP2018/044350, Filed on Dec. 3, 2018, 6 pages including English Translation.

* cited by examiner

*Primary Examiner* — Kurt Fernstrom
(74) *Attorney, Agent, or Firm* — XSENSUS LLP

(57) ABSTRACT

A heart model includes a deformable body forming a simulated ventricle therein that expand and contract, and a restraint body outside of the simulated ventricle and having a spiral outer shape, the restraint body regulating deformation of the deformable to generate a twist in the deformable body when the simulated ventricle expands.

16 Claims, 22 Drawing Sheets

FIG.11
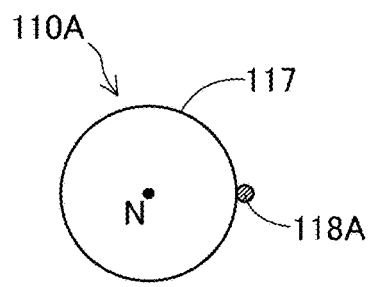
FIG. 11A
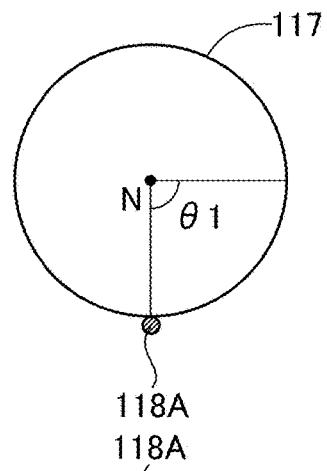
FIG. 11B
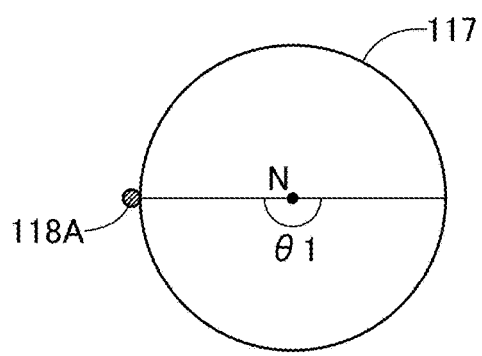
FIG. 11C
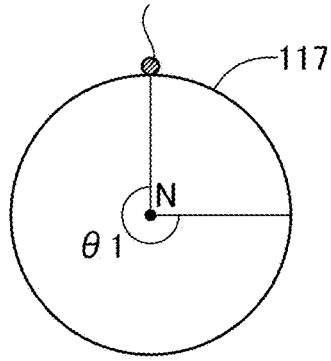
FIG. 11D
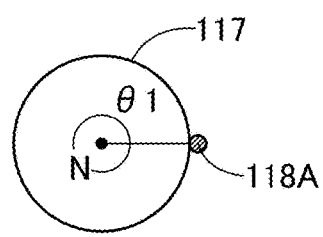
FIG. 11E

FIG.13
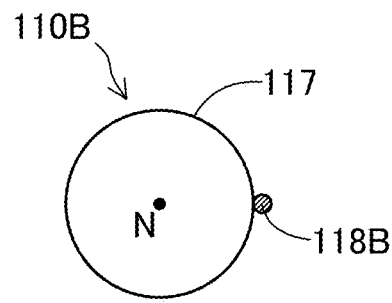
FIG. 13A
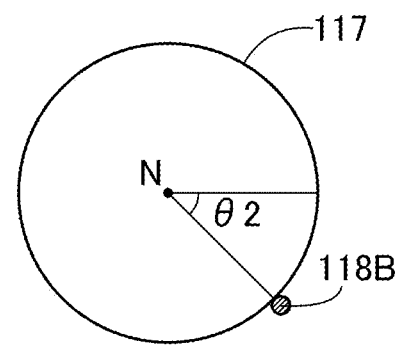
FIG. 13B
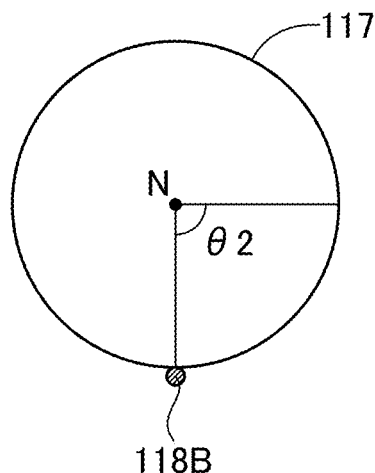
FIG. 13C
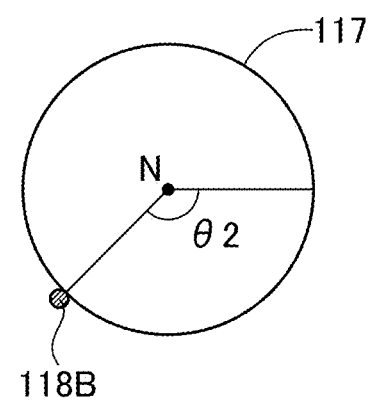
FIG. 13D
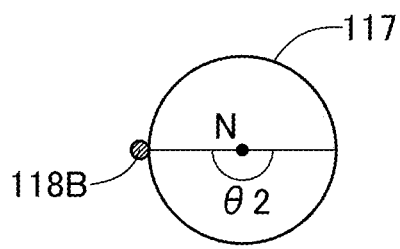
FIG. 13E

FIG.15
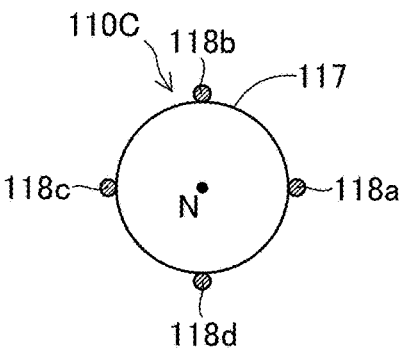
FIG. 15A
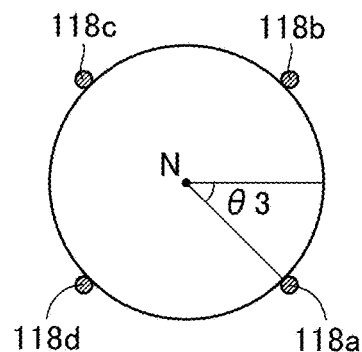
FIG. 15B
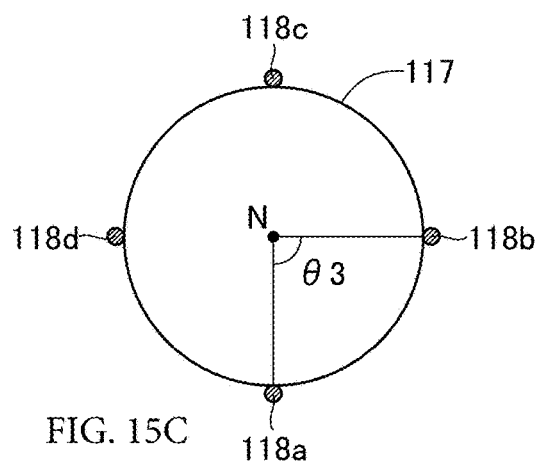
FIG. 15C
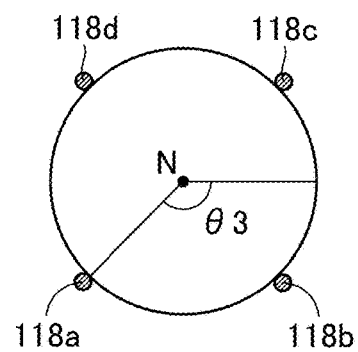
FIG. 15D
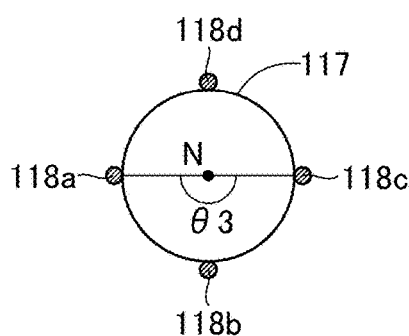
FIG. 15E

FIG.21
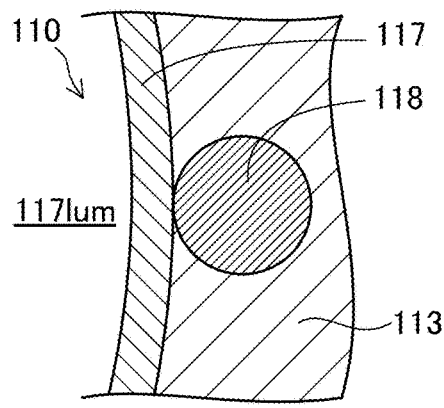
FIG. 21A
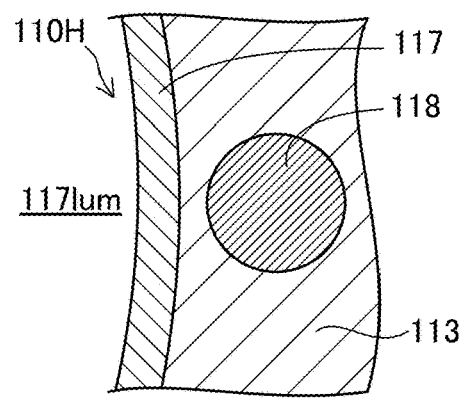
FIG. 21B
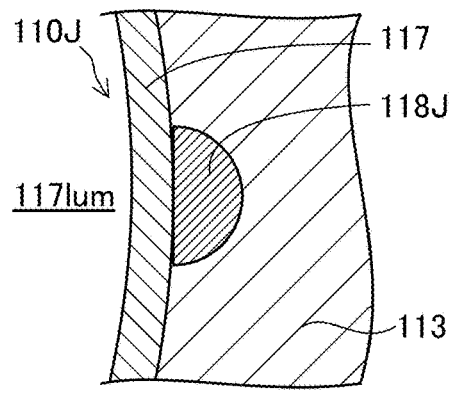
FIG. 21C
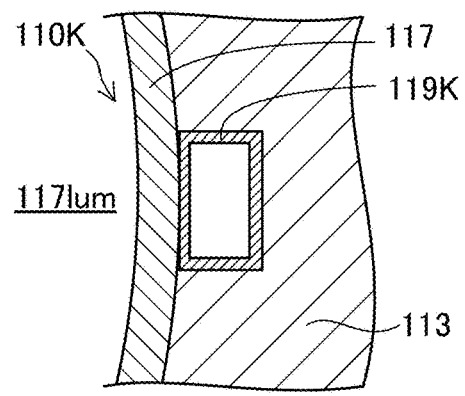
FIG. 21D
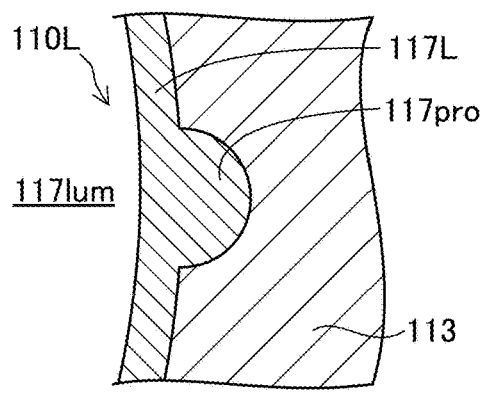
FIG. 21E
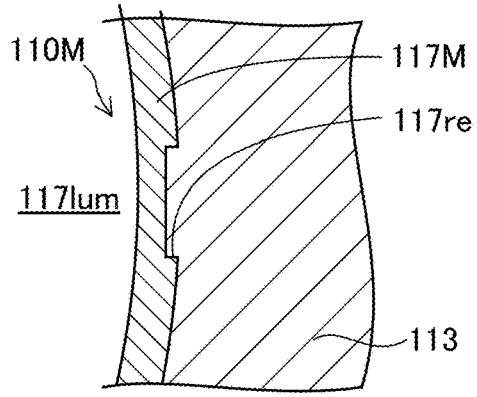
FIG. 21F

FIG.22
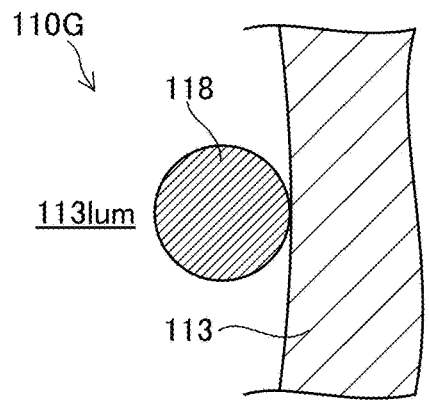
FIG. 22A
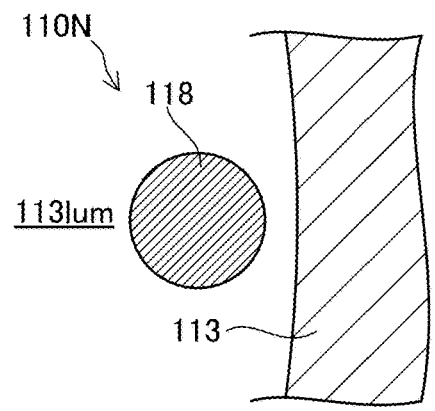
FIG. 22B
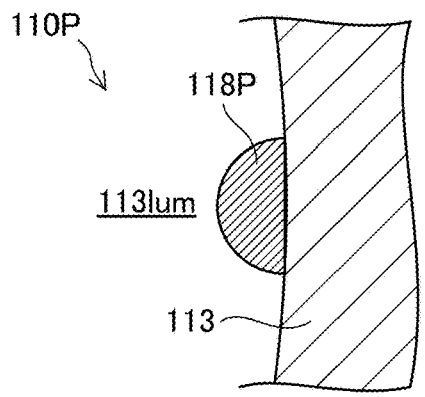
FIG. 22C
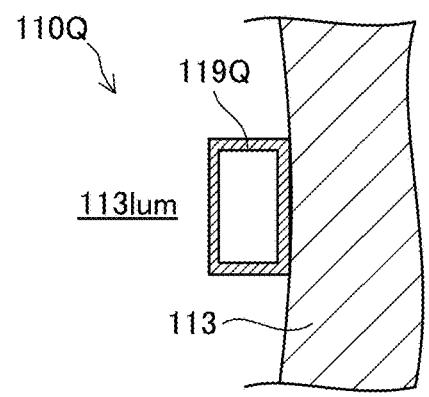
FIG. 22D
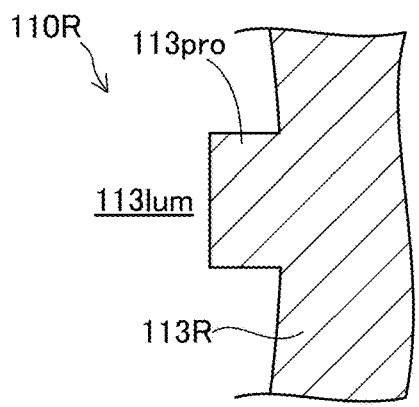
FIG. 22E
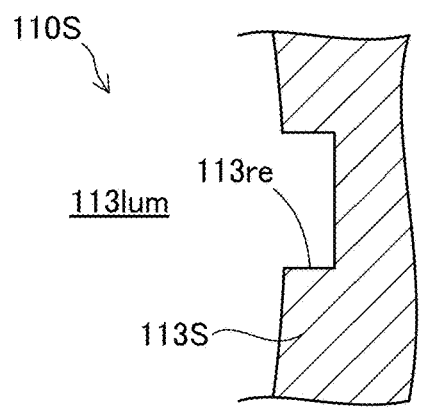
FIG. 22F

HEART MODEL

CROSS-REFERENCE TO RELATED APPLICATION

This application is a continuation application of International Application No. PCT/JP2018/044350, filed Dec. 3, 2018, the entire disclosure of which is incorporated herein by reference.

BACKGROUND

Disclosed embodiments relate to a heart model.

Conventionally, there is known a heart model that simulates a heart and is formed of silicone rubber or the like for an operator such as a doctor to perform surgery and treatment training. For example, Patent Literature 1 discloses a trainer for cardiac surgery in which a heart model is expanded and contracted by changing a pressure in a tube embedded in the heart model. Patent Literature 2 discloses a heart simulator in which an intake/exhaust tube is attached to an intake/exhaust port of a heart model provided with an atrium and a ventricle and an air inside the atrium and the ventricle is taken in and out through the intake/exhaust tube so that the heart model is expanded and contracted. Patent Literature 3 discloses a cardiac phantom including a left ventricle that beats to be available for medical imaging by separately and mutually moving a fluid in a tank that simulates a chest and a fluid in a left ventricular assembly.

CITATION LIST

Patent Literature

Patent Literature 1: Japanese Unexamined Patent Application Publication (Translation of PCT Application) No. 2004-508589
Patent Literature 2: Japanese Unexamined Patent Application Publication No. 2007-333781
Patent Literature 3: Japanese Unexamined Patent Application Publication (Translation of PCT Application) No. 2003-536107

In the above conventional technologies, for example, Patent Literature 1 provides a configuration in which the heart model is twisted during expansion and contraction, as in an actual heart. However, even in the above conventional technologies, there is room for further improvement into a technique of generating a twist during expansion and contraction with a simpler configuration in the heart model.

The disclosed embodiments have been made to solve at least a part of the above-mentioned problems, and an object thereof is to improve a technique of generating a twist during expansion and contraction with a simpler configuration in a heart model.

SUMMARY

The disclosed embodiments have been made to solve at least some of the above-described problems, and can be implemented as the following aspects.

(1) According to one aspect of the disclosed embodiments, a heart model is provided. The heart model includes a ventricle formation portion forming a simulated ventricle and being deformable so that the simulated ventricle expands and contracts, and a twist generation portion being provided outside of the simulated ventricle and having a spiral outer shape, the twist generation portion regulating deformation of the ventricle formation portion to generate a twist in the ventricle formation portion when the simulated ventricle expands.

According to the configuration, the twist generation portion having a spiral outer shape is provided outside the simulated ventricle formed by the ventricle formation portion, and thus, when the simulated ventricle is expanded, the deformation of the ventricle formation portion is regulated by the twist generation portion, and thus, a twist can be generated in the ventricle formation member. Therefore, according to the configuration, it is possible to generate a twist during expansion and contraction with a simple configuration.

(2) In the heart model of the aspect, the twist generation portion may be formed of a material having a higher rigidity than the ventricle formation portion. According to the configuration, when the simulated ventricle is expanded, the deformation of the ventricle formation portion can be further regulated by the twist generation portion, so that a size of the twist generation portion required to generate a desired twist can be decreased. Therefore, according to the configuration, it is possible to generate a twist during expansion and contraction with a simpler configuration.

(3) In the heart model of the aspect, the twist generation portion may be integrally formed with the ventricle formation portion with the same material as the ventricle formation portion. According to the configuration, it is possible to generate a twist during expansion and contraction with a simpler configuration in which the ventricle formation portion and the twist generation portion are integrally formed.

(4) In the heart model of the aspect, the twist generation portion may surround an outside of the simulated ventricle by 180 degrees or more when viewed from an axial direction connecting a heart base portion and a heart apex portion of the heart model. According to the configuration, when the simulated ventricle is expanded, it is possible to uniformly regulate the deformation of the ventricle formation portion in a circumferential direction by the twist generation portion. This allows a twist of the heart model to more closely imitate a twist of an actual heart.

(5) In the heart model of the aspect, the twist generation portion may be arranged in a spiral shape from a heart base portion side of the heart model toward a heart apex portion side thereof, outside the simulated ventricle. According to the configuration, when the simulated ventricle is expanded, a twisting direction of the heart model can more closely imitate a twisting direction of an actual heart.

(6) In the heart model of the aspect, the twist generation portion may include a plurality of the twist generation portions arranged outside the simulated ventricle. According to the configuration, when the simulated ventricle is expanded, it is possible to uniformly regulate the deformation of the ventricle formation portion in a circumferential direction by the plurality of twist generation portions. This allows a twist of the heart model to more closely imitate a twist of an actual heart.

(7) In the heart model of the aspect, the twist generation portion may have a clockwise spiral shape. According to the configuration, when the simulated ventricle expands, a twisting direction of the heart model can more closely imitate a twisting direction of an actual heart.

(8) In the heart model of the aspect, the twist generation portions may be fixed to the ventricle formation portion at a plurality of locations. According to the configuration, when the simulated ventricle is expanded, it is possible to more easily twist the ventricle formation portion by the twist generation portions.

(9) In the heart model of the aspect, it may be possible that the ventricle formation portion is a balloon-shaped member, the twist generation portion is arranged on an outer surface of the ventricle formation portion, and the heart model further includes a cardiac muscle formation portion that forms a simulated cardiac muscle that covers both the ventricle formation portion and the twist generation portion. According to the configuration, the cardiac muscle formation portion is twisted by a twist of the ventricle formation portion, and thus, with a simpler configuration, it is possible to generate the twist of the cardiac muscle formation portion during expansion and contraction.

(10) In the heart model of the aspect, there is further provided a cardiac beat portion capable of expanding the simulated ventricle by supplying fluid to an interior of the simulated ventricle and contracting the simulated ventricle by removing the fluid from the interior of the simulated ventricle. According to the configuration, it is possible to easily expand and contract the heart model by the cardiac beat portion.

It is noted that the disclosed embodiments can be realized in various manners, and can be realized, for example, in a manner of a blood vessel model simulating a blood vessel of the heart or the like, an organ model simulating an organ such as the heart, a human body simulation device including at least some of the above models, a simulation method, or the like.

BRIEF DESCRIPTION OF DRAWINGS

FIG. 11(A) to FIG. 11(E) are explanatory diagrams each illustrating an A-A cross section of FIG. 10.

FIG. 13(A) to FIG. 13(E) are explanatory diagrams each illustrating a B-B cross section of FIG. 12.

FIG. 15(A) to FIG. 15(E) are diagrams each explaining a C-C cross section of FIG. 14.

FIGS. 21(A) to 21(F) are diagrams each explaining a heart model according to a first modification.

FIGS. 22(A) to 22(F) are diagrams each explaining a heart model according a second modification.

DETAILED DESCRIPTION

First Embodiment

Figure 1:
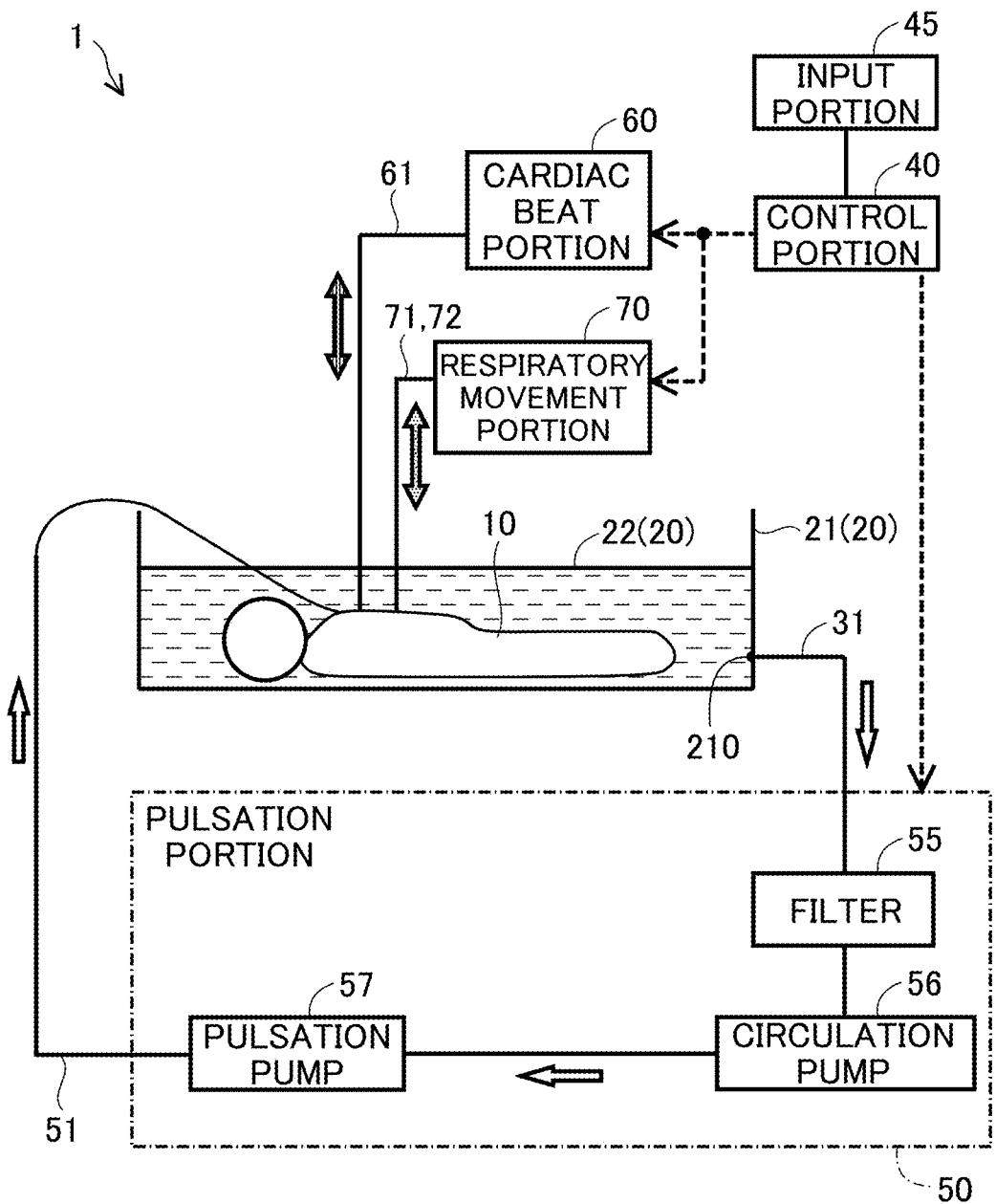
FIG. 1 is a first diagram illustrating a schematic configuration of a human body simulation device.
Figure 2:
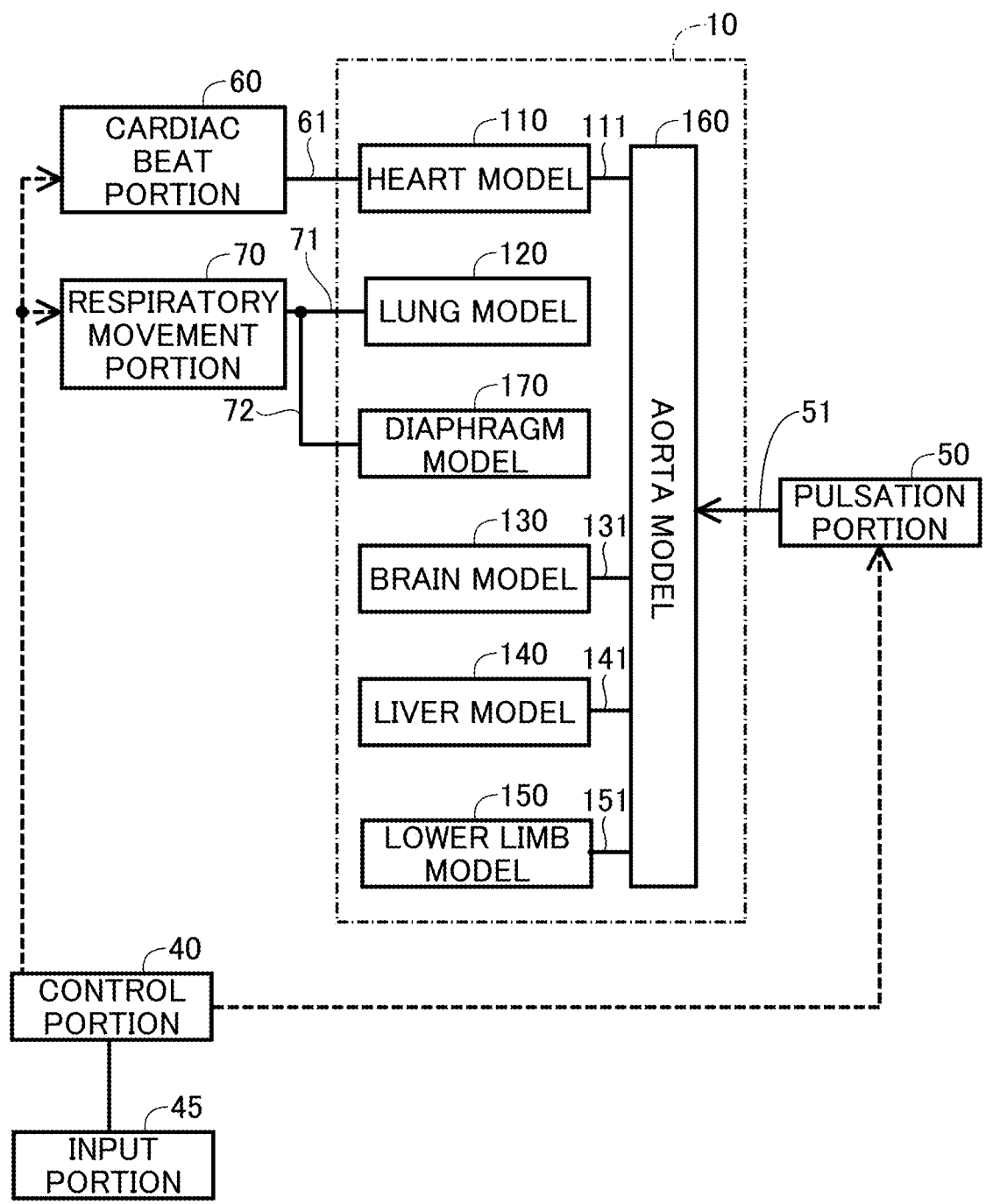
FIG. 2 is a second diagram illustrating the schematic configuration of the human body simulation device.

FIG. 1 and FIG. 2 are diagrams each illustrating a schematic configuration of a human body simulation device 1. The human body simulation device 1 of the present embodiment is a device for use in simulating a treatment or examination procedure by using a medical device in a lumen of a living body including a human circulatory system, a human digestive system, and a human respiratory system. The medical device means a device for minimally invasive treatment or examination, such as a catheter and a guide wire. The human body simulation device 1 includes a model 10, an accommodation portion 20, a control portion 40, an input portion 45, a pulsation portion 50, a cardiac beat portion 60, and a respiratory movement portion 70.

As illustrated in FIG. 2, the model 10 includes a heart model 110 simulating a human heart, a lung model 120 simulating a lung, a diaphragm model 170 simulating a diaphragm, a brain model 130 simulating a brain, a liver model 140 simulating a liver, lower limb models 150 simulating a lower limb, and an aorta model 160 simulating an aorta. Hereinafter, the heart model 110, the lung model 120, the diaphragm model 170, the brain model 130, the liver model 140, and the lower limb models 150 are also collectively referred to as "biological model". In addition, the heart model 110, the brain model 130, the liver model 140, and the lower limb models 150 are also collectively referred to as "organ model". The lung model 120 and the diaphragm model 170 are also collectively referred to as "respiratory organ model". Each of the biological models except the lung model 120 and the diaphragm model 170 (that is, each of the organ models) is connected to the aorta model 160. The model 10 will be described later in detail.

The accommodation portion 20 includes a water tank 21 and a covering portion 22. The water tank 21 is a substantially rectangular parallelepiped water tank having an open upper part. As illustrated in FIG. 1, the model 10 is submerged in a fluid by placing the model 10 on a bottom surface of the water tank 21 in a state where the inside of the water tank 21 is filled with the fluid. Water (liquid) is employed for the fluid in the present embodiment, and thus, it is possible to keep the model 10 in a moist state like an actual human body. It is noted that another liquid (such as physiological saline and an aqueous solution of any compound) may be employed for the fluid. The fluid loaded in the water tank 21 is taken into the inside of the aorta model 160 and the like of the model 10 and functions as "simulated blood" that simulates a blood.

The covering portion 22 is a plate-shaped member that covers an opening of the water tank 21. When the covering portion 22 is placed in a state where one surface of the covering portion 22 contacts the fluid and the other surface contacts an outside air, the covering portion 22 functions as a wave-eliminating plate. As a result, it is possible to suppress a decrease in visibility due to a waviness of the fluid inside the water tank 21. The water tank 21 and the covering portion 22 of the present embodiment are formed of a synthetic resin (for example, an acrylic resin) having high radiolucency and high transparency, and thus, it is possible to improve a visibility of the model 10 from the outside. It is noted that the water tank 21 and the covering portion 22 may be formed of another synthetic resin, or the water tank 21 and the covering portion 22 may be formed of different materials.

The control portion 40 includes CPU, ROM, RAM, and a storage portion not illustrated, and operations of the pulsation portion 50, the cardiac beat portion 60, and the respiratory movement portion 70 are controlled by developing a computer program stored in the ROM into the RAM for execution. The input portion 45 is various interfaces used by a user to input information to the human body simulation device 1. Examples of the input portion 45 include a touch panel, a keyboard, an operation button, an operation dial, or a microphone. In the following example, the touch panel will be employed for the input portion 45.

The pulsation portion 50 is a "fluid supply portion" that delivers a pulsated fluid to the aorta model 160. Specifically, the pulsation portion 50 circulates the fluid in the water tank 21 and supplies the fluid to the aorta model 160 of the model 10, as illustrated by a white arrow in FIG. 1. The pulsation portion 50 of the present embodiment includes a filter 55, a circulation pump 56, and a pulsation pump 57. The filter 55 is connected to an opening 210 of the water tank 21 via a tubular body 31. The filter 55 removes impurities (such as a contrast medium used in a procedure) in the fluid by filtering the fluid passing through the filter 55. The circulation pump 56 is, for example, a non-positive displacement centrifugal pump that circulates the fluid supplied from the water tank 21 via the tubular body 31 at a constant flow rate.

The pulsation pump 57 is, for example, a positive displacement reciprocating pump that applies pulsation to the fluid delivered from the circulation pump 56. The pulsation pump 57 is connect to the aorta model 160 of the model 10 via a tubular body 51 (FIG. 2). Therefore, the fluid delivered from the pulsation pump 57 is supplied to an inner cavity of the aorta model 160. It is noted that a rotary pump operated at a low speed may be employed for the pulsation pump 57, instead of the reciprocating pump. Further, the filter 55 and the circulation pump 56 may be omitted. The tubular body 31 and the tubular body 51 are tubes having flexibility and being formed of a synthetic resin (for example, silicon) being a soft material and having radiolucency.

The cardiac beat portion 60 causes the heart model 110 to beat. Specifically, as illustrated by a diagonally hatched arrow in FIG. 1, the cardiac beat portion 60 expands the heart model 110 by delivering the fluid into the inner cavity of the heart model 110, and contracts the heart model 110 by suctioning the fluid from the inner cavity of the heart model 110. Thus, the cardiac beat portion 60 provides a fluid flow path to and from the heart model 110. The cardiac beat portion 60 realizes a heartbeat motion (expansion and contraction motion) of the heart model 110 by repeating these delivering and suctioning operations. The fluid used in the cardiac beat portion 60 (hereafter, also referred to as "expansion medium") may be a liquid, as in the case of the simulated blood, and a gas such as air may also be used. The expansion medium may be an organic solvent such as benzene or ethanol, or a radiation-permeable liquid such as water. The cardiac beat portion 60 can be realized by using, for example, a positive displacement reciprocating pump. The cardiac beat portion 60 is connect to the heart model 110 of the model 10 via a tubular body 61 (FIG. 2). The tubular body 61 is a tube having flexibility and being formed of a synthetic resin (for example, silicon) being a soft material and having radiolucency.

The respiratory movement portion 70 causes the lung model 120 and the diaphragm model 170 to perform a movement simulating a respiratory movement. Specifically, as indicated by an arrow with a dot hatched in FIG. 1, the respiratory movement portion 70 delivers the fluid to the inner cavity of the lung model 120 and the diaphragm model 170 to expand the lung model 120 and contract the diaphragm model 170. In addition, the respiratory movement portion 70 suctions the fluid from the inner cavity of the lung model 120 and the diaphragm model 170 to contract the lung model 120 and relax the diaphragm model 170. The respiratory movement portion 70 realizes the respiratory movement of the lung model 120 and the diaphragm model 170 by repeating these delivering and suctioning operations. A liquid may be used for the fluid used in the respiratory movement portion 70, as in the case of the simulated blood, and a gas such as air may be used. The respiratory movement portion 70 can be realized by using, for example, a positive displacement reciprocating pump. The respiratory movement portion 70 is connect to the lung model 120 of the model 10 via a tubular body 71, and is connect to the diaphragm model 170 via a tubular body 72 (FIG. 2). The tubular bodies 71 and 72 are tubes having flexibility and being formed of a synthetic resin (for example, silicon) being a soft material and having radiolucency.

Figure 3:
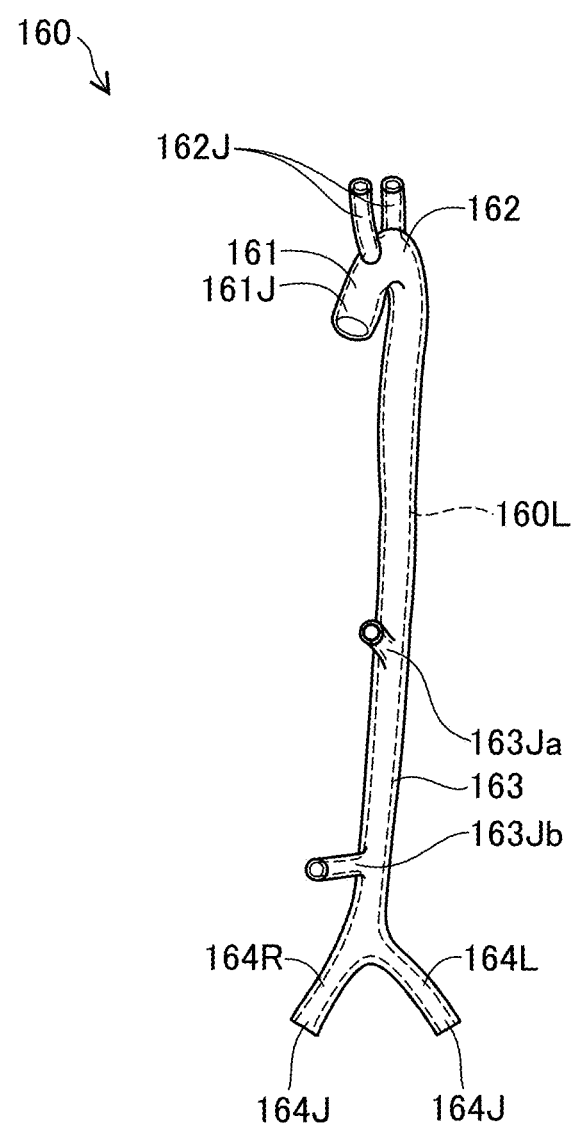
FIG. 3 is a diagram illustrating a schematic configuration of an aorta model.

FIG. 3 is a diagram illustrating a schematic configuration of the aorta model 160. The aorta model 160 includes each component simulating a human aorta, that is, an ascending aorta portion 161 simulating an ascending aorta, an aortic arch portion 162 simulating an aortic arch, an abdominal aorta portion 163 simulating an abdominal aorta, and a common iliac artery portion 164 simulating a common iliac artery.

The aorta model 160 includes a second connection portion 161J used to connect the heart model 110 at an end of the ascending aorta portion 161. Similarly, in the vicinity of the aortic arch portion 162, a first connection portion 162J used to connect the brain model 130 is provided, in the vicinity of the abdominal aorta portion 163, a third connection portion 163Ja used to connect the liver model 140 is provided, at an end of the common iliac artery portion 164, two fourth connection portions 164J used to connect the right and left lower limb models 150 are provided. It is noted that it suffices that the second connection portion 161J is arranged in or near the ascending aorta portion 161 and that the fourth connection portions 164J are arranged in or near the common iliac artery portion 164. Hereinafter, these first to fourth connection portions 161J to 164J are also collectively referred to as "biological model connection portion". Further, the aorta model 160 includes a fluid supply portion connection portion 163Jb used to connect the pulsation portion 50 in the vicinity of the abdominal aorta portion 163. The fluid supply portion connection portion 163Jb may be arranged at any position such as not only in the vicinity of the abdominal aorta portion 163, but also in the vicinity of the ascending aorta portion 161 and in the vicinity of a cerebrovascular model 131 (for example, a common carotid artery). Further, the aorta model 160 may include a plurality of the fluid supply portion connection portions 163Jb arranged at different positions.

Further, inside the aorta model 160, an inner cavity 160L opened in each of the above-described biological model connection portion and fluid supply portion connection portion (the first connection portion 162J, the second connection portion 161J, the third connection portion 163Ja, the two fourth connection portions 164J, and the fluid supply portion connection portion 163Jb), is formed. The inner cavity 160L functions as a flow passage through which the simulated blood (fluid) supplied from the pulsation portion 50 is transported to the heart model 110, the brain model 130, the liver model 140, and the lower limb models 150.

The aorta model 160 of the present embodiment is formed of a synthetic resin (for example, polyvinyl alcohol (PVA) and silicon) being a soft material and having radiolucency. In particular, when the PVA is used, a hydrophilicity of PVA allows a tactile sensation of the aorta model 160 submerged in the liquid more closely simulates a tactile sensation of the aorta of the actual human body.

The aorta model 160 can be produced, for example, as follows. First, a frame simulating a shape of the aorta of the human body is prepared. The frame may be created by inputting data of a portion corresponding to the aorta, out of human body model data generated by analyzing a computed tomography (CT) image of an actual human body, a magnetic resonance imaging (MRI) image, and the like, into a 3D printer, for example, and printing the resultant data. The frame may be made of gypsum, a metal, or a resin. Next, a liquefied synthetic resin material is applied to the inside of the prepared frame, and after the synthetic resin material is cooled and solidified, the synthetic resin material is removed from the frame. Thus, the aorta model 160 including the inner cavity 160L can be easily produced.

Figure 4:
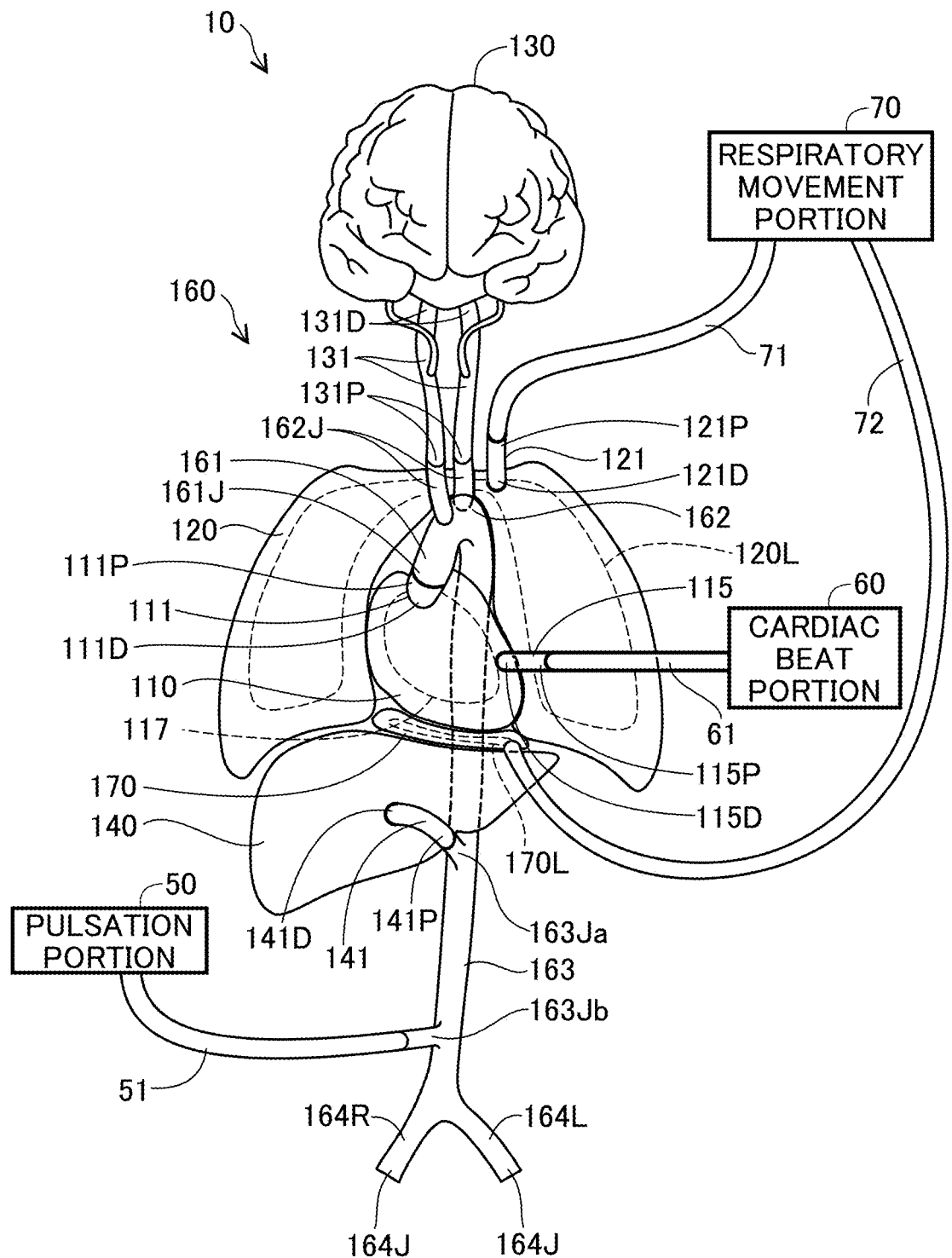
FIG. 4 is a first diagram illustrating a schematic configuration of a model.
Figure 5:
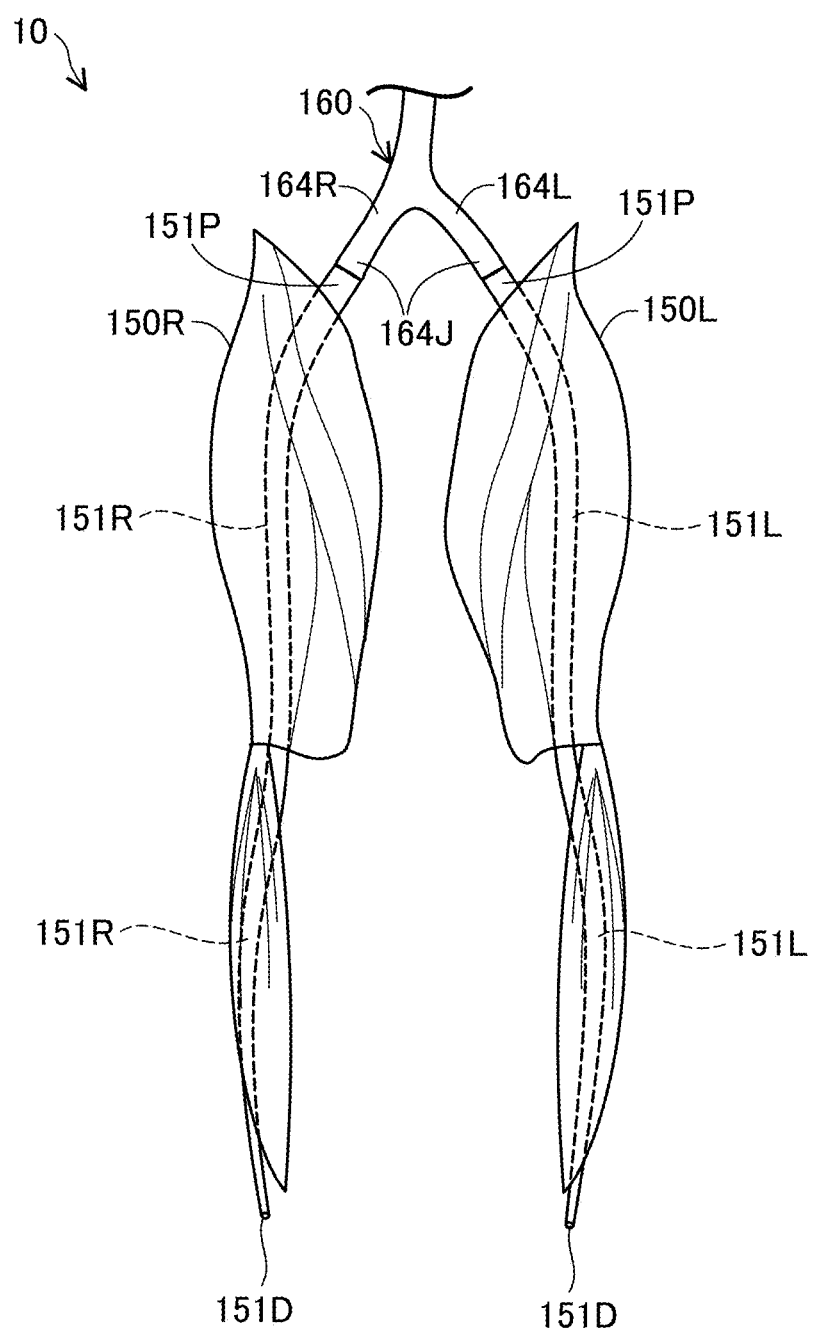
FIG. 5 is a second diagram illustrating a schematic configuration of the model.

FIGS. 4 and 5 are diagrams each illustrating a schematic configuration of the model 10. As illustrated in FIG. 4, the heart model 110 has a shape simulating a heart, and a ventricle formation member 117 is arranged therein. The heart model 110 of the present embodiment is formed of a synthetic resin (for example, urethane and silicon) being a soft material and having radiolucency, and similarly to the aorta model 160, may be produced by applying the synthetic resin material to the inside of a frame produced from human body model data and removing the synthetic resin material from the frame. Further, the heart model 110 includes a cardiovascular model 111 and a tubular body 115. The cardiovascular model 111 is a tubular blood vessel model simulating a part of an ascending aorta and a coronary artery, and is formed of a synthetic resin (for example, PVA and silicon) being a soft material and having radiolucency. The tubular body 115 is a flexible tube made of a synthetic resin (for example, silicon) being a soft material and having radiolucency. The tubular body 115 has its distal end 115D being connected to communicate with a space inside the ventricle formation member 117, and its proximal end 115P being connected to communicate with the tubular body 61 connecting to the cardiac beat portion 60.

The lung model 120 has a shape simulating each of a right lung and a left lung, and is formed therein with one inner cavity 120L in a state where the right lung and the left lung are communicated. The lung model 120 is arranged to cover the left and right sides of the heart model 110. A material and a method that can be used to produce the lung model 120 are similar to those of the heart model 110. The material of the lung model 120 and the material of the heart model 110 may be the same or different. Further, the lung model 120 includes a trachea model 121 that is a tubular model simulating a part of a trachea. The trachea model 121 can be formed of the material similar to the tubular body 115 of the heart model 110. The material of the trachea model 121 and the material of the tubular body 115 may be the same or different. The trachea model 121 has its distal end 121D being connected to communicate with the inner cavity 120L of the lung model 120, and its proximal end 121P being connected to communicate with the tubular body 71 that connects to the respiratory movement portion 70.

The diaphragm model 170 has a shape simulating a diaphragm, and is formed therein with an inner cavity 170L. The diaphragm model 170 is arranged below the heart model 110 (in other words, in a direction opposite to the brain model 130 with the heart model 110 being interposed therebetween). A material and a method that can be used to produce the diaphragm model 170 are similar to those of the heart model 110. The material of the diaphragm model 170 and the material of the heart model 110 may be the same or different. Further, the diaphragm model 170 is connected with the tubular body 72 that connects to the respiratory movement portion 70, in a state where the inner cavity 170L of the diaphragm model 170 and the inner cavity of the tubular body 72 are communicated.

The brain model 130 has a shape simulating a brain and has a solid shape having no inner cavity therein. The brain model 130 is arranged above the heart model 110 (in other words, in a direction opposite to the diaphragm model 170 with the heart model 110 being interposed therebetween). A material and a method that can be used to produce the brain model 130 are similar to those of the heart model 110. The material of the brain model 130 and the material of the heart model 110 may be the same or different. Further, the brain model 130 includes the cerebrovascular model 131 which is a tubular vascular model simulating at least a part of a major artery including from a pair of left and right common carotid arteries to a pair of left and right vertebral arteries. The cerebrovascular model 131 can be formed of the material similar to the cardiovascular model 111 of the heart model 110. The material of the cerebrovascular model 131 and the material of the cardiovascular model 111 may be the same or different. Further, although not illustrated, the cerebrovascular model 131 may simulate not only the artery but also major veins including a superior cerebral vein and a straight sinus.

The brain model 130 may be a complex further including a bone model simulating a human skull and a cervical spine. For example, the skull may include a hard resin case that simulates a parietal bone, a temporal bone, an occipital bone, and a sphenoid bone, and a lid simulating a frontal bone, and the cervical spine may include a plurality of rectangular resin bodies having therein through holes through which blood vessel model can pass. When the bone model is provided, the bone model is formed of a resin with a hardness different from that of the organ model such as a blood vessel model and a brain model, and, for example, the skull may be formed of an acrylic resin and the vertebrae may be formed of PVA.

The cerebrovascular model 131 has its distal end 131D being connected to the brain model 130 and its proximal end 131P being connected to the first connection portion 162J of the aorta model 160 (for example, a human brachiocephalic artery, subclavian artery, or a portion in the vicinity thereof). The distal end 131D of the cerebrovascular model 131 may simulate a vertebral artery that passes through the vertebrae and other blood vessels disposed on a surface and/or inside of the brain model 130 (for example, a posterior cerebral artery and a middle cerebral artery), and further may simulate a posterior communicating artery and be connected to a peripheral part of a common carotid artery. Further, the proximal end 131P of the cerebrovascular model 131 is connected to the first connection portion 162J, in a state where the inner cavity of the cerebrovascular model 131 and the inner cavity 160L of the aorta model 160 are communicated with each other.

The liver model 140 has a shape simulating a liver and has a solid shape having therein no inner cavity. The liver model 140 is arranged below the diaphragm model 170. A material and a method that can be used to produce the liver model 140 are similar to those of the heart model 110. The material of the liver model 140 and the material of the heart model 110 may be the same or different. In addition, the liver model 140 includes a hepatic vascular model 141 which is a tubular blood vessel model simulating a part of a hepatic artery. The hepatic vascular model 141 can be formed of the material similar to the cardiovascular model 111 of the heart model 110. The material of the hepatic vascular model 141 and the material of the cardiovascular model 111 may be the same or different.

The hepatic vascular model 141 has its distal end 141D being connected to the liver model 140 and its proximal end 141P being connected to the third connection portion 163Ja of the aorta model 160. The distal end 141D of the hepatic vascular model 141 may simulate another blood vessels (for example, a hepatic artery) arranged on a surface and/or inside of the liver model 140. Further, the proximal end 141P of the hepatic vascular model 141 is connected to the third connection portion 163Ja, in a state where the inner cavity of the hepatic vascular model 141 and the inner cavity 160L of the aorta model 160 are communicated with each other.

As illustrated in FIG. 5, the lower limb models 150 include a lower limb model 150R corresponding to a right leg and a lower limb model 150L corresponding to a left leg. The lower limb models 150R and 150L have the same configuration except for bilaterally symmetric arrangement, and thus, in the following description, both are collectively referred to as "lower limb model 150". The lower limb model 150 has a shape simulating at least a part of quadriceps femoris present on a thigh and a tibialis anterior muscle of a lower thigh, major tissues such as a peroneus longus and an extensor digitorum longus, and has a solid shape having therein no inner cavity. A material and a method that can be used to produce the lower limb model 150 are similar to those of the heart model 110. The material of the lower limb model 150 and the material of the heart model 110 may be the same or different. Further, the lower limb model 150 includes a lower limb vascular model 151 (lower limb blood vessel models 151R, 151L) which is a tubular vascular model simulating at least a part of main arteries including a femoral artery to a dorsalis pedis artery. The lower limb vascular model 151 can be formed of the material similar to the cardiovascular model 111 of the heart model 110. The material of the lower limb vascular model 151 and the material of the cardiovascular model 111 may be the same or different. Further, although not illustrated, the lower limb vascular model 151 may simulate not only arteries but also major veins including from a common iliac vein to a great saphenous vein.

The lower limb vascular model 151 is arranged to extend from a thigh toward a lower thigh side in an extension direction, inside of the lower limb model 150. The lower limb vascular model 151 has its distal end 151D being exposed to a lower end (position corresponding to an area from a base of a foot to a back of the foot) of the lower limb model 150 and its proximal end 151P being connected to the fourth connection portions 164J of the aorta model 160. Here, the proximal end 151P is connected to the fourth connection portions 164J in a state where the inner cavity of the lower limb vascular model 151 and the inner cavity 160L of the aorta model 160 are communicated with each other.

It is noted that the above-mentioned cardiovascular model 111, cerebrovascular model 131, hepatic vascular model 141, and lower limb vascular model 151 are also collectively referred to as "vascular model". Further, the vascular model and the aorta model 160 are also collectively referred to as "systemic vascular model". With such a configuration, for example, a posterior cerebral artery of the brain, a left coronary artery, and a right coronary artery of the heart can be simulated by the vascular model arranged on the surface of each biological model. Further, for example, a middle cerebral artery of the brain, a hepatic artery of the liver, a femoral artery of the lower limbs, and the like can be simulated by the vascular model arranged inside each biological model.

In the human body simulation device 1 of the present embodiment, when at least one of the biological models (the heart model 110, the lung model 120, the diaphragm model 170, the brain model 130, the liver model 140, and the lower limb model 150) are attached to or detached from the aorta model 160, it is possible to configure the model 10 in various modes. A combination of the biological models (the heart model 110, the lung model 120, the diaphragm model 170, the brain model 130, the liver model 140, and the lower limb model 150) attached to the aorta model 160 can be freely changed according to organs required for a procedure. For example, if the model 10 attached with the heart model 110 and the lower limb model 150 is configured, it is possible to simulate the procedure of the PCI total femoral artery approach (TFI: Trans-Femoral Intervention) by utilizing the human body simulation device 1. In addition, for example, all the biological models except for the lower limb model 150 may be attached, the heart model 110 and the lung model 120 may be attached, the lung model 120 and the diaphragm model 170 may be attached, only the liver model 140 may be attached, and only the lower limb model 150 may be attached.

As described above, according to the human body simulation device 1 of the present embodiment, when the biological model connection portion (the first connection portion 162J, the second connection portion 161J, the third connection portion 163Ja, and the fourth connection portions 164J) is connected with the biological model (the heart model 110, the brain model 130, the liver model 140, and the lower limb model 150) simulating a part in a human body, it is possible to simulate various procedures using medical devices such as a catheter and a guide wire for biological lumens of each organ according to the connected biological model such as a circulatory system and a digestive system. Further, the biological model connection portions 161J to 164J can be attachably and detachably connected with the biological model, and thus, it is possible to remove the biological model unnecessary for the procedure and store the removed biological model separately, which can improve convenience.

Figure 6:
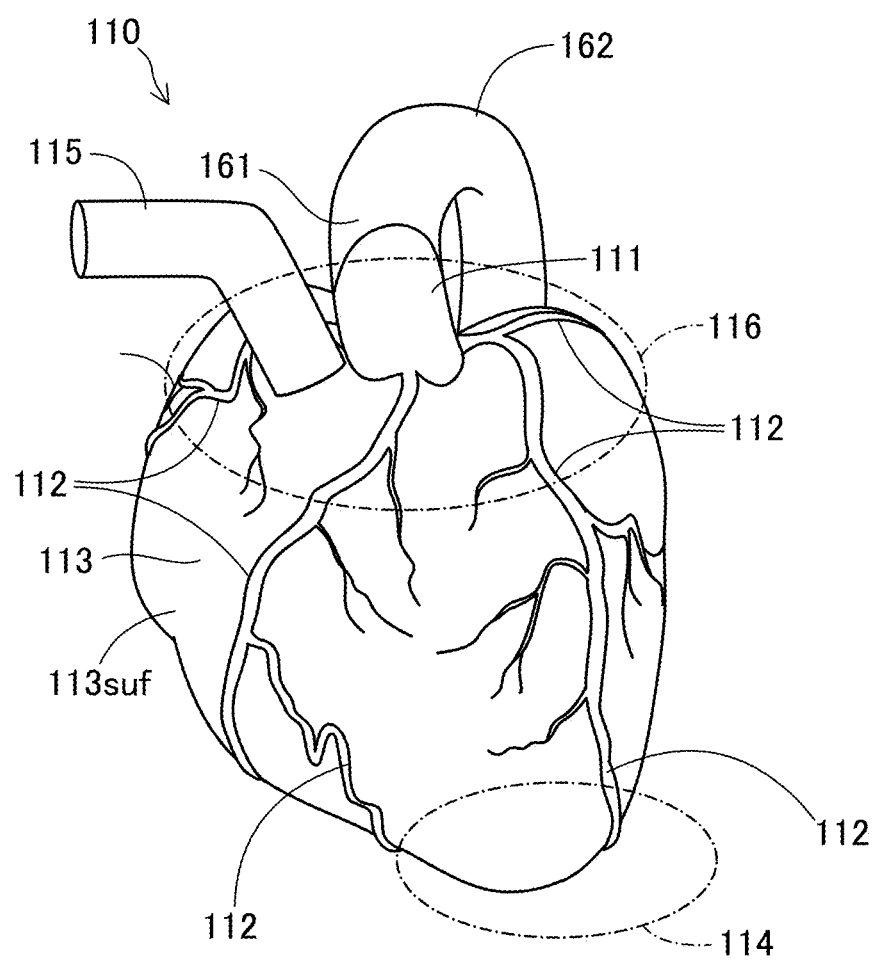
FIG. 6 is an explanatory diagram illustrating an external configuration of a heart model.
Figure 7:
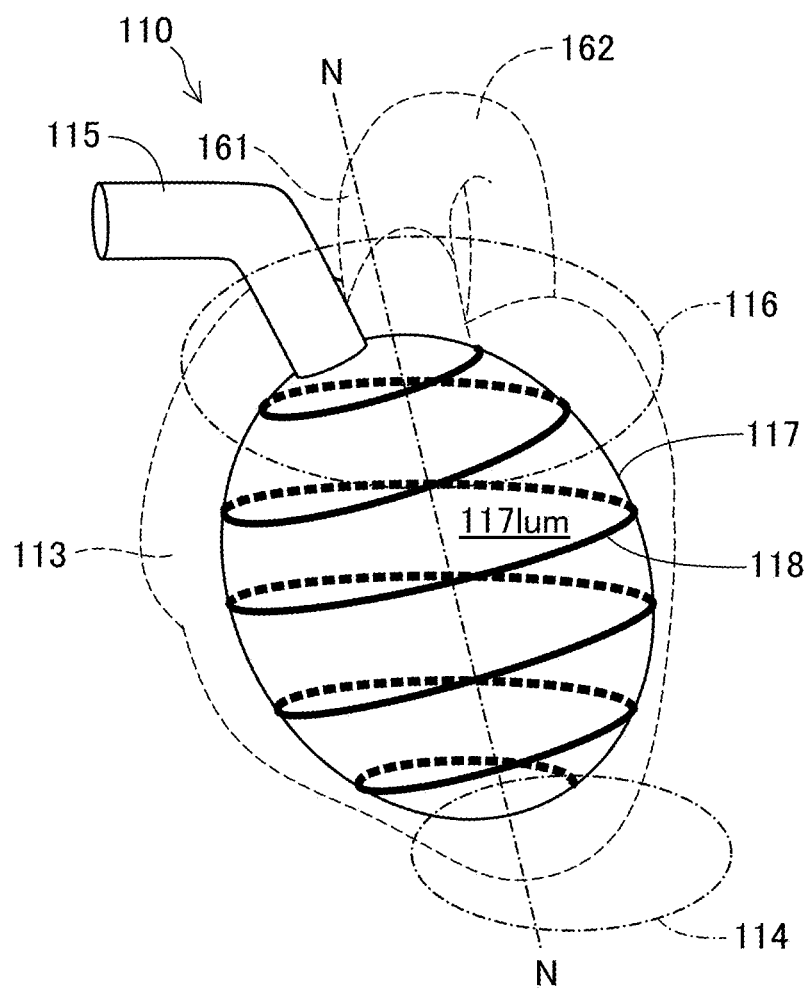
FIG. 7 is an explanatory diagram illustrating an internal configuration of the heart model.

A schematic configuration of the heart model 110 will be described with reference to FIG. 6 and FIG. 7. FIG. 6 is an explanatory diagram illustrating an external configuration of the heart model 110. FIG. 7 is an explanatory diagram illustrating an internal configuration of the heart model 110. The heart model 110 includes the above-mentioned cardiovascular model 111, ventricle formation member 117, and in addition thereto, a cardiac muscle formation member 113 and a restraint body 118.

The cardiac muscle formation member 113 is a member that forms a simulated cardiac muscle of the heart model 110, and is formed of, for example, urethane. The cardiac muscle formation member 113 forms the outside of the heart model 110 including a heart base portion 116 and a heart apex portion 114. An outer surface 113suf of the heart model 110 formed by the cardiac muscle formation member 113 is provided with the cardiovascular model 111. The cardiovascular model 111 includes a coronary artery model 112 that simulates left and right coronary arteries. The coronary artery model 112 has a shape in which a plurality of side branches extend from a main branch on the outer surface 113suf of the heart model 110. The heart model 110 functions as a simulator capable of simulating a state of a deep staining recognized in an X-ray image of an actual human body in an X-ray image obtained when a contrast medium is used for the cardiovascular model 111. As illustrated in FIG. 7, the ventricle formation member 117 and the restraint body 118 are arranged inside the simulated cardiac muscle formed by the cardiac muscle formation member 113.

The ventricle formation member 117 is a deformable body, e.g., a balloon-shaped member formed of natural rubber having a thickness of about 0.1 to 1 mm, and defines therein a simulated ventricle 117*lum* as an inner cavity part. The simulated ventricle 117*lum* communicates with, e.g., is in fluid communication with, the tubular body 115. When the tubular body 115 supplies the fluid to the simulated ventricle 117*lum* and the fluid is suctioned from the simulated ventricle 117*lum*, the simulated ventricle 117*lum* expands and contracts, respectively. An outer shape of the ventricle formation member 117 expands and contracts in response to the expansion and contraction of the simulated ventricle 117*lum*. The expansion and contraction of the ventricle formation member 117 causes the cardiac muscle formation member 113 covering the ventricle formation member 117 to expand and contract, and as a result, a heartbeat similar to that of the actual heart is simulated by the heart model 110.

The restraint body 118 is a clockwise spiral member (spiral coil) formed of a wire having a higher rigidity than the ventricle formation member 117, and is arranged on the outer surface of the ventricle formation member 117. The restraint body 118 functions as a "twist generation portion" that regulates deformation of the ventricle formation member 117 when the ventricle formation member 117 is expanded and deformed, and causes the ventricle formation member 117 to twist. The restraint body 118 can be formed, for example, of a wire formed of a metal or a resin having a circular cross section. The restraint body 118 of the present embodiment surrounds the outside of the ventricle formation member 117 by 180 degrees or more when viewed from an axis N direction connecting the heart base portion 116 and the heart apex portion 114 of the heart model 110. Further, a spiral traveling direction is a direction along an axis N. "The spiral traveling direction is along the axis N" means that the restraint body 118 is arranged to form a clockwise spiral shape from the heart base portion 116 toward the heart apex portion 114 when viewed from the axis N direction. The restraint body 118 of the present embodiment has a configuration where the restraint body 118 spirally winds around the outside of the ventricle formation member 117 by about five turns. The number of times that the restraint body 118 winds around the outside of the ventricle formation member 117 (the number of windings) may be in the range of 0.5 to 10 rotations, e.g., in the range of 1 to 5 rotations, more specifically in the range of three to four rotations.

Figure 8:
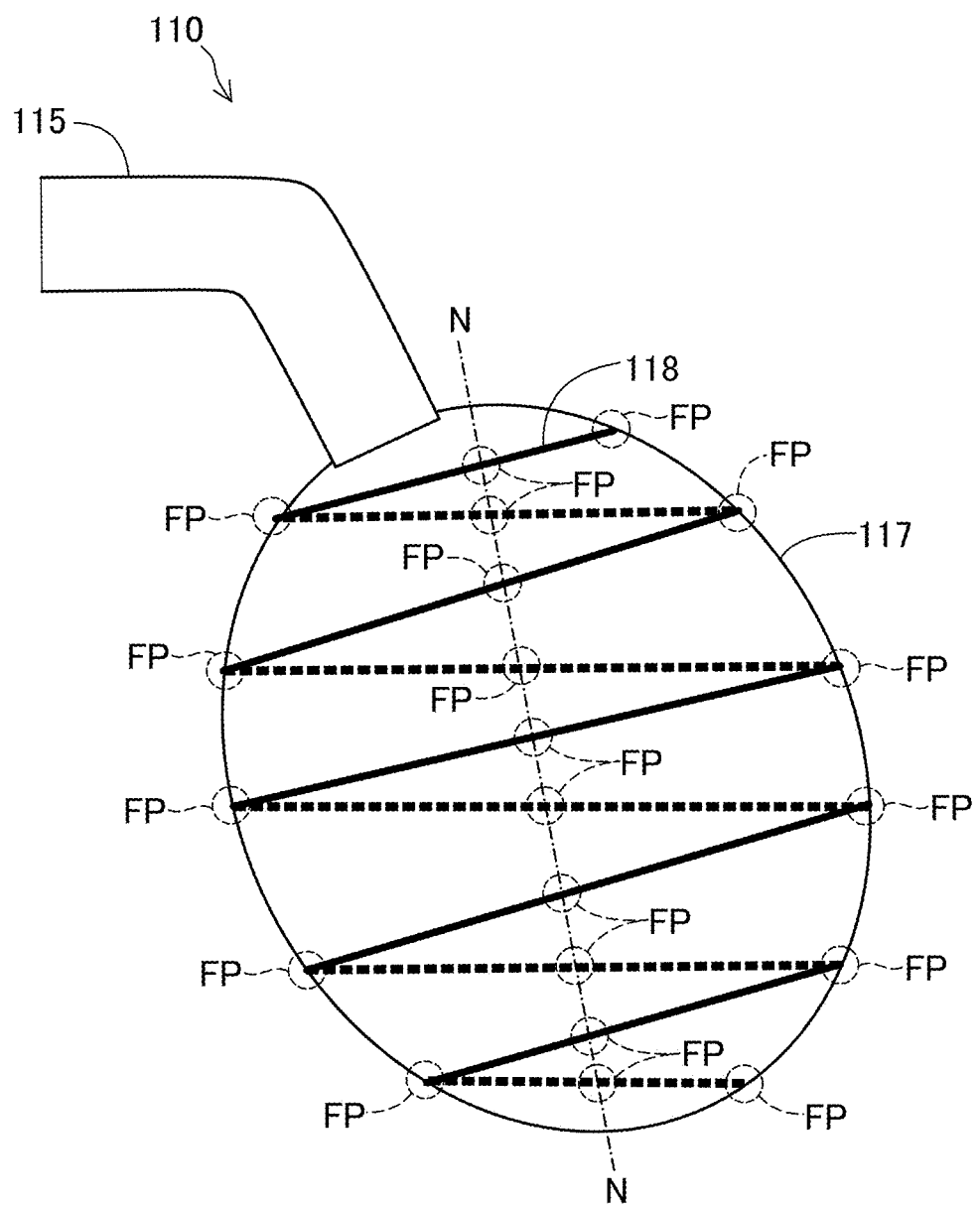
FIG. 8 is a diagram for explaining a fixation portion between a ventricle formation member and a restraint body.

FIG. 8 is a diagram for explaining fixation portions FP between the ventricle formation member 117 and the restraint body 118. The restraint body 118 is fixed to the ventricle formation member 117 at a plurality of the fixation portions FP, and is not fixed at other portions. The fixation portions FP are provided at predetermined intervals in the restraint body 118. At such a fixation portion FP, the restraint body 118 and the ventricle formation member 117 may be fixed with an adhesive or may be welded. As described above, the ventricle formation member 117 and the restraint body 118 are partially fixed by the fixation portion FP. As a result, as compared to a case where the ventricle formation member 117 and the restraint body 118 are entirely fixed, a degree of freedom of the ventricle formation member 117 with respect to the restraint body 118 is increased, and as a result, when the ventricle formation member 117 is expanded, the ventricle formation member 117 may be more easily twisted by the restraint body 118.

Figure 9A:
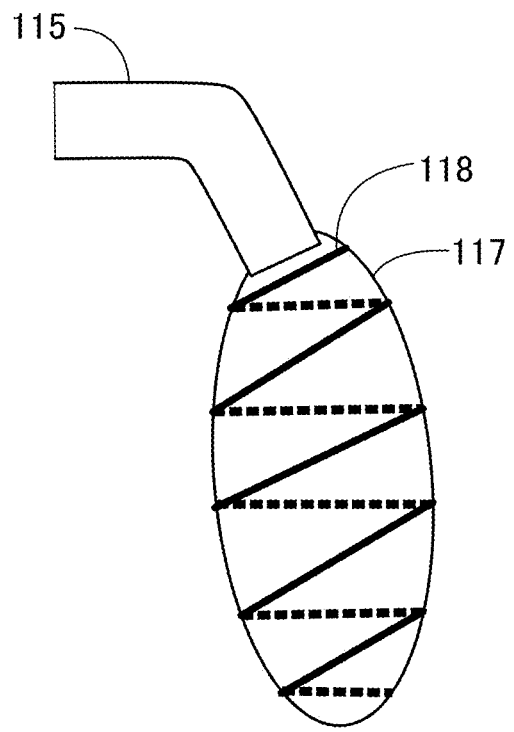
FIG. 9(A) and FIG. 9(B) are diagrams each explaining a state of a ventricle formation member and a restraint body during expansion and contraction.
Figure 9B:
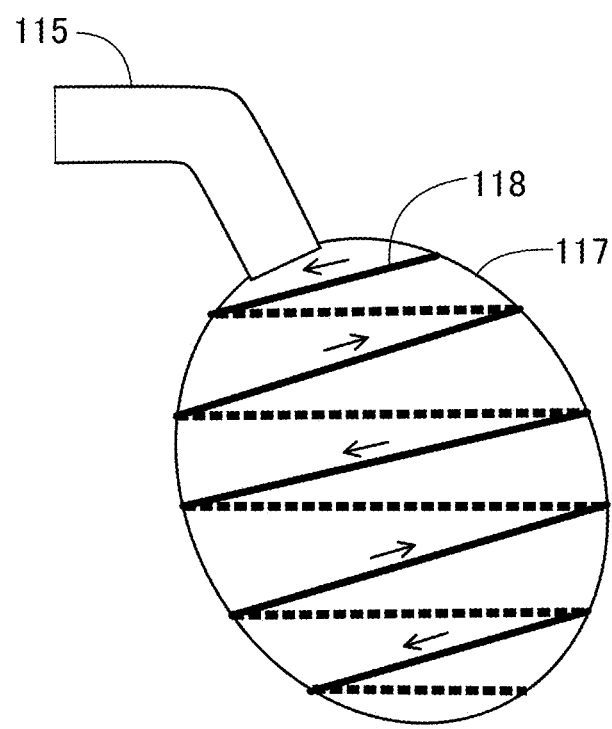

FIG. 9(A) is a diagram for explaining a state of the ventricle formation member 117 and the restraint body 118 during contraction of the ventricle formation member 117. FIG. 9(B) is a diagram for explaining a state of the ventricle formation member 117 and the restraint body 118 during expansion of the ventricle formation member 117. When the inner cavity (simulated ventricle) of the ventricle formation member 117 is pressed from the contracted state of FIG. 9(A), the ventricle formation member 117 is uniformly expanded to push up the restraint body 118 from the inside. When the restraint body 118 is uniformly expanded and widened from the inside, a relative position of the restraint body 18 is displaced between coils of the restraint body 118 as illustrated by the arrows in FIG. 9(B). The ventricle formation member 117 is twisted to follow the relative displacement between coils of the restraint body 118. This twist causes the heart model 110 to be contorted. Depending on the spiral traveling direction and the number of rotations (number of turns) of the restraint body 118 with respect to the ventricle formation member 117, it is possible to adjust a contortion direction and a contortion angle of the heart model 110.

The restraint body 118 may be wound around the outside of the ventricle formation member 117 by one or more turns, that is, may surround the ventricle formation member 117 by 180 degrees or more. When the ventricle formation member 117 is expanded, the restraint body 118 may uniformly regulate the deformation of the ventricle formation member 117 in a circumferential direction by surrounding the outside of the ventricle formation member 117 by 180 degrees or more. As a result, the ventricle formation member 117 can be twisted substantially evenly in the circumferential direction. Further, the restraint body 118 of the present embodiment has a clockwise spiral, and thus, the twisting direction can bear a greater resemblance to the twisting direction of the actual heart. According to the heart model 110 of the present embodiment described above, as illustrated in FIG. 7, the restraint body 118 having a spiral outer shape is arranged outside the simulated ventricle 117*lum* formed by the ventricle formation member 117. Thus, when the simulated ventricle 117*lum* expands, the deformation of the ventricle formation member 117 is regulated by the restraint body 118 to generate a twist in the ventricle formation member 117. Therefore, according to the configuration, a twist during expansion and contraction in the heart model 110 may be generated with a simple configuration.

Further, according to the heart model 110 of the present embodiment, the restraint body 118 is formed of a material having a higher rigidity than the ventricle formation member 117. Thus, when the simulated ventricle 117*lum* expands, deformation of the ventricle formation member 117 may be further regulated by the restraint body 118. As a result, it is possible to decrease the size of the restraint body 118 required to generate a desired twist, for example. Therefore, with a simpler configuration, it is possible to generate a twist during expansion and contraction.

According to the heart model 110 of the present embodiment, the restraint body 118 surrounds the outside of the ventricle formation member 117 by 180 degrees or more when viewed from an axis N direction connecting the heart base portion 116 and the heart apex portion 114 of the heart model 110. Therefore, when the ventricle formation member 117 is expanded, expansion of the ventricle formation member 117 in the circumferential direction may be uniformly regulate by the restraint body 118. This allows a twist of the heart model 110 to more closely imitate a twist of an actual heart.

Further, according to the heart model 110 of the present embodiment, outside the simulated ventricle 117*lum*, the restraint body 118 is arranged spirally from the heart base portion 116 side of the heart model 110 toward the heart apex portion 114 side thereof. Therefore, a twisting direction of the heart model 110 can more closely imitate a twisting direction of the actual heart. Further, according to the heart model 110 of the present embodiment, the restraint body 118 is fixed to the ventricle formation member 117 at the plurality of fixation portions FP. Thus the ventricle formation member 117 maybe more easily twisted by the restraint body 118.

Second Embodiment

Figure 10:
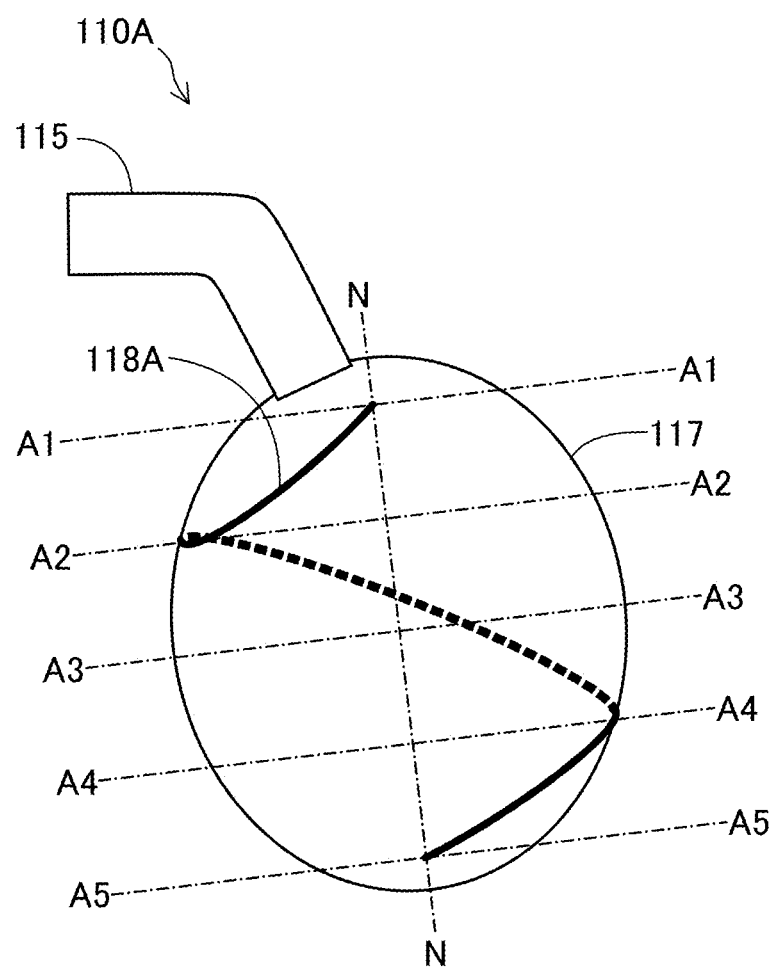
FIG. 10 is a diagram for explaining a heart model according to a second embodiment.

FIG. 10 is a diagram for explaining a heart model 110A of a second embodiment. In FIG. 10, only the ventricle formation member 117 and a restraint body 118A of the heart model 110A are illustrated, and the cardiac muscle formation member 113 and the coronary artery model 112 are not illustrated. The heart model 110A of the second embodiment is different from the heart model 110 (FIG. 7) of the first embodiment in the number of spiral windings (number of rotations) of the restraint body. The restraint body 118A of the second embodiment has a configuration in which the restraint body 118A is spirally wound around the outside of the ventricle formation member 117 by about one turn. Other parts of the configuration are similar to those of the first embodiment, and thus, description thereof will be omitted.

FIG. 11(A) to FIG. 11(E) are explanatory diagrams each illustrating an A-A cross section of FIG. 10. FIG. 11(A) illustrates an A1-A1 cross section of FIG. 10. FIG. 11(B) illustrates an A2-A2 cross section of FIG. 10. FIG. 11(C) illustrates an A3-A3 cross section of FIG. 10. FIG. 11(D) illustrates an A4-A4 cross section of FIG. 10. FIG. 11(E) illustrates an A5-A5 cross section of FIG. 10. Here, an angle formed by a straight line extending from the position of the restraint body 118A (on the right side of the ventricle formation member 117) in the A1-A1 cross section of FIG. 11(A) to the axis N and a straight line extending from the position of the restraint body 118A in each A-A cross section of FIGS. 11(B) to 11(E) to the axis N is $\theta1$ ($>0$). In FIG. 11(B), $\theta1 \approx 90$ degrees, in FIG. 11(C), $\theta1 \approx 180$ degrees, in FIG. 11(D), $\theta1 \approx 270$ degrees, and in FIG. 11(E), $\theta1 \approx 360$ degrees. As described above, the restraint body 118A of the second embodiment surrounds the outside of the ventricle formation member 117 by 180 degrees or more when viewed from the axis N direction. Further, the restraint body 118A is spirally arranged clockwise from the heart base portion 116 toward the heart apex portion 114 on the outer circumference of the ventricle formation member 117.

According to the above-described heart model 110A of the second embodiment, the number of spiral windings (number of rotations) of the restraint body may be less than that of the first embodiment, e.g., five rotations. If the number of spiral windings (number of rotations) is one rotation as in the restraint body 118A of the second embodiment, the restraint body 118A surrounds the outside of the ventricle formation member 117 by 180 degrees or more. Thus, when the simulated ventricle is expanded, the expansion of the ventricle formation member 117 in the circumferential direction may be uniformly regulated by the restraint body 118A. This allows a twist of the heart model 110A to more closely imitate or simulate a twist of an actual heart.

Third Embodiment

Figure 12:
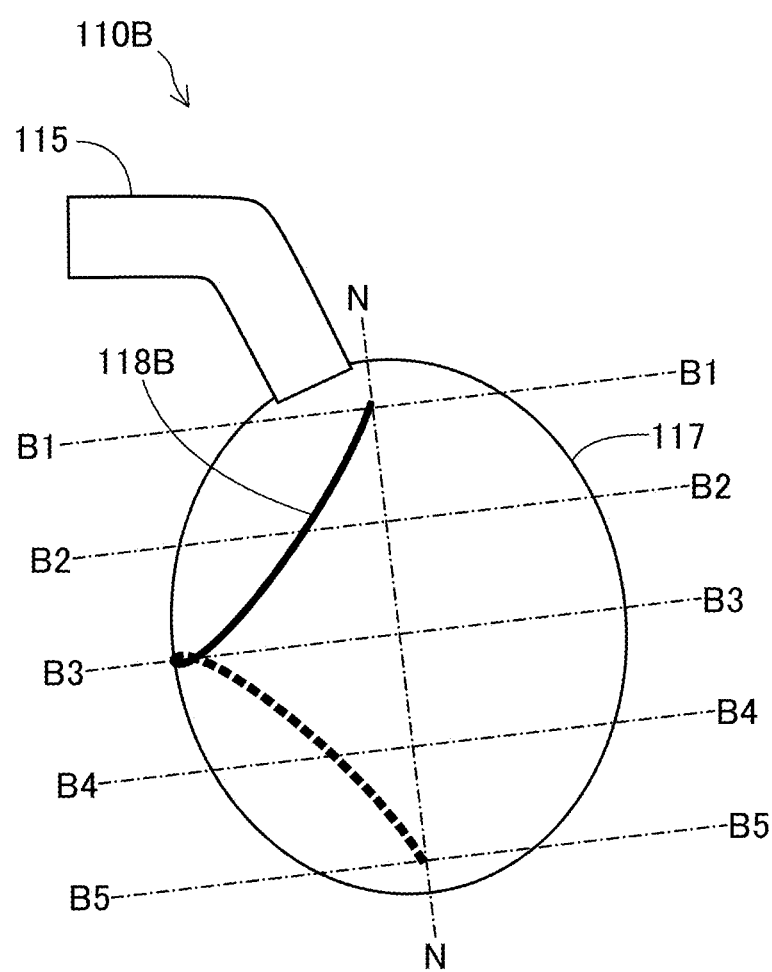
FIG. 12 is a diagram for explaining a heart model according to a third embodiment.

FIG. 12 is a diagram for explaining a heart model 110B of a third embodiment. In FIG. 12, only the ventricle formation member 117 and a restraint body 118B of the heart model 110B are illustrated, and the cardiac muscle formation member 113 and the coronary artery model 112 are not illustrated. When compared to the heart model 110 (FIG. 7) of the first embodiment, the heart model 110B of the third embodiment has a fewer number of spiral windings (number of rotations) of the restraint body. The restraint body 118B of the third embodiment has a configuration in which the restraint body 118B spirally winds on about half of the circumference on the outside of the ventricle formation member 117. Other parts of the configuration are similar to those of the first embodiment, and thus, description thereof will be omitted.

FIG. 13(A) to FIG. 13(E) are explanatory diagrams each illustrating a B-B cross section of FIG. 12. FIG. 13(A) illustrates a B1-B1 cross section of FIG. 12. FIG. 13(B) illustrates a B2-B2 cross section of FIG. 12. FIG. 13(C) illustrates a B3-B3 cross section of FIG. 12. FIG. 13(D) illustrates a B4-B4 cross section of FIG. 12. FIG. 13(E) illustrates a B5-B5 cross section of FIG. 12. Here, an angle formed by a straight line extending from the position of the restraint body 118B (on the right side of the ventricle formation member 117) in the B1-B1 cross section of FIG. 13(A) to the axis N and a straight line extending from the position of the restraint body 118B in each B-B cross section of FIGS. 13(B) to 13(E) to the axis N is $\theta2$ ($>0$). In FIG. 13(B), $\theta2 \approx 45$ degrees, in FIG. 13(C), $\theta2 \approx 90$ degrees, in FIG. 13(D), $\theta2 \approx 135$ degrees, and in FIG. 13(E), $\theta2 \approx 180$ degrees. As described above, the restraint body 118B of the third embodiment surrounds the outside of the ventricle formation member 117 by 180 degrees or more when viewed from the axis N direction. Further, the restraint body 118B is spirally arranged clockwise from the heart base portion 116 toward the heart apex portion 114 on the outer circumference of the ventricle formation member 117.

According to the above-described heart model 110B of the third embodiment, the number of spiral windings (number of rotations) of the restraint body may be less than one rotation. If the number of spiral windings (number of rotations) is 0.5 rotations or more as in the restraint body 118B of the third embodiment, the restraint body 118B surrounds the outside of the ventricle formation member 117 by 180 degrees or more. Thus, when the simulated ventricle is expanded, the expansion of the ventricle formation member 117 in the circumferential direction may be uniformly regulated by the restraint body 118B.

Fourth Embodiment

Figure 14:
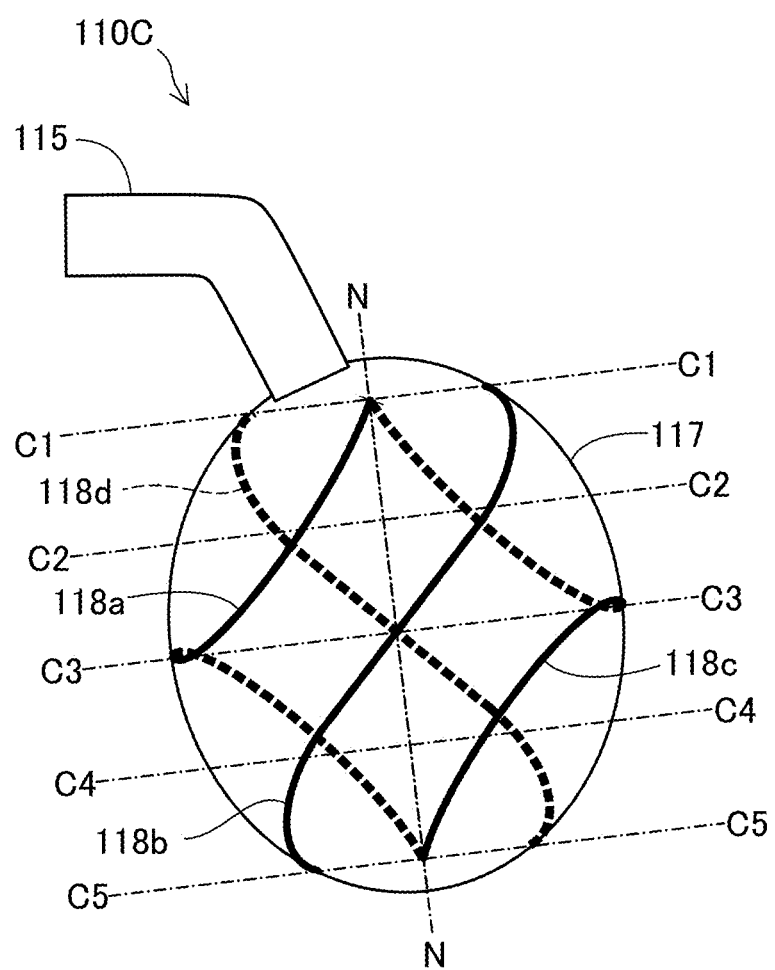
FIG. 14 is a diagram for explaining a heart model according to a fourth embodiment.

FIG. 14 is a diagram for explaining a heart model 110C of a fourth embodiment. In FIG. 14, only the ventricle formation member 117 and restraint bodies 118a, 118b, 118c, and 118d of the heart model 110C are illustrated, and the cardiac muscle formation member 113 and the coronary artery model 112 are not illustrated. The heart model 110C of the fourth embodiment is different from the heart model 110 (FIG. 7) of the first embodiment in the number of restraint bodies and the number of spiral windings of the restraint body. In the heart model 110C of the fourth embodiment, the four restraint bodies 118a, 118b, 118c, and 118d are arranged outside the ventricle formation member 117. Each of the restraint bodies 118a, 118b, 118c, and 118d has a configuration in which the restraint bodies 118a, 118b, 118c, and 118d spirally wind on about half of the circumference on the outside of the ventricle formation member 117. The four restraint bodies 118a, 118b, 118c, and 118d are arranged side by side at substantially equal intervals in the circumferential direction of the ventricle formation member 117. Other parts of the configuration are similar to those of the first embodiment, and thus, description thereof will be omitted.

FIG. 15(A) to FIG. 15(E) are diagrams each explaining a C-C cross section of FIG. 14. FIG. 15(A) illustrates a C1-C1 cross section of FIG. 14. FIG. 15(B) illustrates a C2-C2 cross section of FIG. 14. FIG. 15(C) illustrates a C3-C3 cross section of FIG. 14. FIG. 15(D) illustrates a C4-C4 cross section of FIG. 14. FIG. 15(E) illustrates a C5-C5 cross section of FIG. 14. Here, an angle formed by a straight line extending from the position of the restraint body 118a (on the right side of the ventricle formation member 117) in the C1-C1 cross section of FIG. 15(A) to the axis N and a straight line extending from the position of the restraint body 118a in each C-C cross section of FIGS. 15(B) to 15(E) to the axis N is θ3 (>0). In FIG. 15(B), θ3≈45 degrees, in FIG. 15(C), θ3≈90 degrees, in FIG. 15(D), θ3≈135 degrees, and in FIG. 15(E), θ3≈180 degrees. As described above, the four restraint bodies 118a, 118b, 118c, and 118d are arranged side by side at substantially equal intervals in the circumferential direction of the ventricle formation member 117, from the heart base portion 116 to the heart apex portion 114, and each surrounds the outside of the ventricle formation member 117 by 180 degrees or more when viewed from the axis N direction. Further, the restraint bodies 118a, 118b, 118c, and 118d are each spirally arranged clockwise from the heart base portion 116 toward the heart apex portion 114 on the outer circumference of the ventricle formation member 117.

According to the above-described heart model 110C of the fourth embodiment, the number of restraint bodies to be arranged outside the ventricle formation member 117 is not limited to one, and may be plural. When the plurality of restraint bodies 118a, 118b, 118c, and 118d are arranged side by side at substantially equal intervals in the circumferential direction of the ventricle formation member 117, from the heart base portion 116 to the heart apex portion 114, as in the heart model 110C of the fourth embodiment, if the simulated ventricle is expanded, it is possible to uniformly regulate the expansion of the ventricle formation member 117 in the circumferential direction by the restraint bodies 118a, 118b, 118c, and 118d. When the number of spiral windings (number of rotations) of each of the four restraint bodies 118a, 118b, 118c, and 118d is 0.5 rotations or more, as in the heart model 110C of the fourth embodiment, each of the restraint bodies 118a, 118b, 118c, and 118d surrounds the outside of the ventricle formation member 117 by 180 degrees or more. Thus, if the simulated ventricle expands, the expansion of the ventricle formation member 117 in the circumferential direction may be further uniformly regulated by each of the restraint bodies 118a, 118b, 118c, and 118d. The number of restraint bodies to be arranged outside the ventricle formation member 117 may be in the range of one to eight.

Fifth Embodiment

Figure 16:
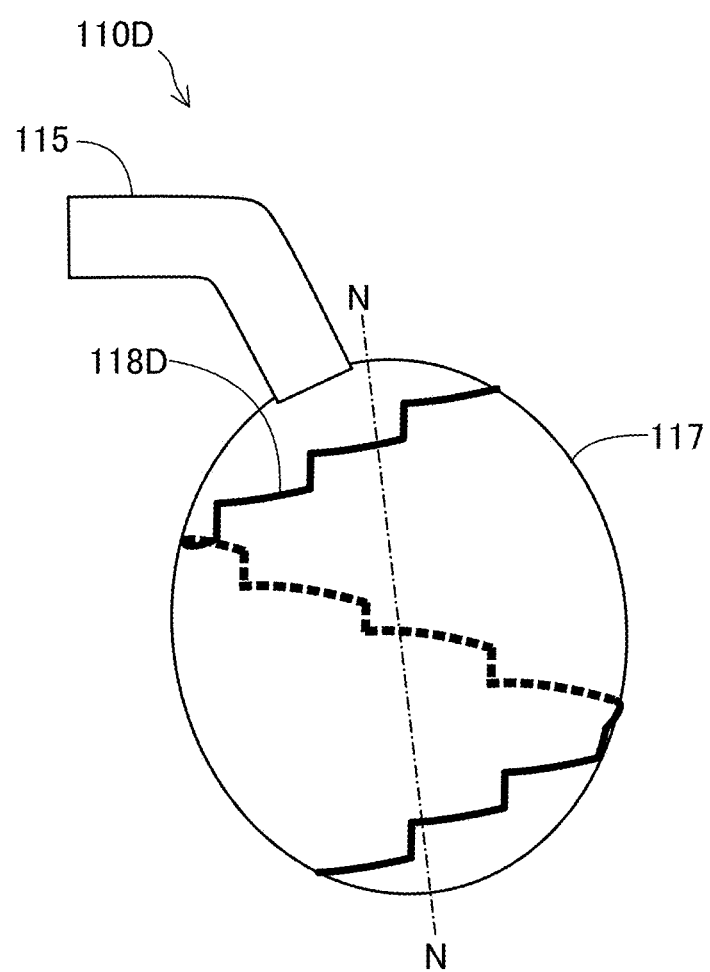
FIG. 16 is a diagram for explaining a heart model according to a fifth embodiment.

FIG. 16 is a diagram for explaining a heart model 110D of a fifth embodiment. In FIG. 16, only the ventricle formation member 117 and a restraint body 118D of the heart model 110D are illustrated, and the cardiac muscle formation member 113 and the coronary artery model 112 are not illustrated. The heart model 110D of the fifth embodiment is different from the heart model 110 (FIG. 7) of the first embodiment in shape of the restraint body and the number of windings thereof. The restraint body 118D of the fifth embodiment has a spiral staircase-shaped outer shape. That is, the restraint body 118D includes a plurality of bent portions, and has a shape in which a portion along the circumferential direction of the ventricle formation member 117 and a portion orthogonal thereto are alternately repeated via the bent portion. The restraint body 118D winds around the outside of the ventricle formation member 117 by about one turn with this spiral staircase-shaped outer shape. Other parts of the configuration are similar to those of the first embodiment, and thus, description thereof will be omitted.

According to the above-described heart model 110D of the fifth embodiment, the shape of the restraint body is not limited to a perfect spiral shape. On the surface of the ventricle formation member 117, the restraint body 118 may suffice to include a portion in which positions in the axis N direction are different from each other and a position in which the portions in the circumferential direction of the ventricle formation member 117 are different from each other. With such a configuration, when the simulated ventricle is expanded, it is possible to generate a twist in the ventricle formation member 117 by regulating deformation of the ventricle formation member 117 by the restraint body 118. In the restraint body 118D of the fifth embodiment, the position of one end in the axis N direction and the position of the other end in the axis N direction are different, and the number of windings (number of rotations) is one rotation or more, and thus, the restraint body 118D includes a position in which the portions in the circumferential direction of the ventricle formation member 117 are different from each other. Therefore, even with the restraint body 118D of the fifth embodiment, the deformation of the ventricle formation member 117 is regulated to generate a twist in the ventricle formation member 117.

Sixth Embodiment

Figure 17:
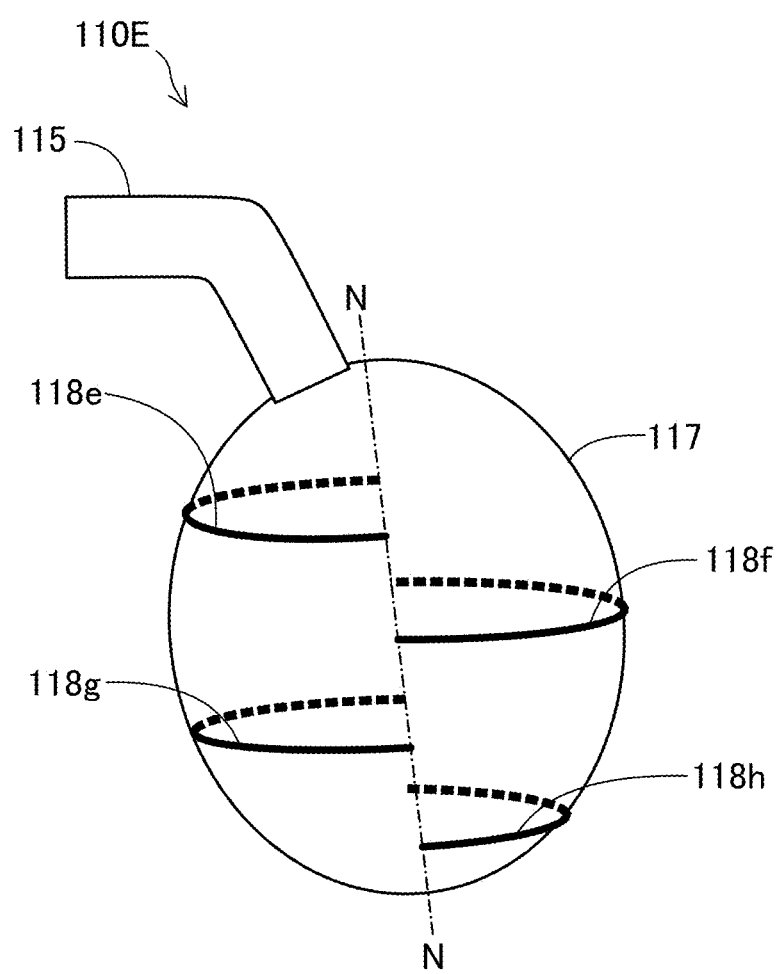
FIG. 17 is a diagram for explaining a heart model according to a sixth embodiment.

FIG. 17 is a diagram for explaining a heart model 110E of a sixth embodiment. In FIG. 17, only the ventricle formation member 117 and a restraint body 118E of the heart model 110E are illustrated, and the cardiac muscle formation member 113 and the coronary artery model 112 are not illustrated. The heart model 110E of the sixth embodiment is different from the heart model 110 (FIG. 7) of the first embodiment in shape of the restraint body, the number thereof, and the number of windings thereof. In the heart model 110E of the sixth embodiment, four restraint bodies 118e, 118f, 118g, and 118h are arranged outside the ventricle formation member 117. Each of the restraint bodies 118e, 118f, 118g, and 118h does not have a spiral shape, but has a U-shape in which the restraint bodies 118a, 118b, 118c, and 118d spirally wind on about half of the circumference on the outside of the ventricle formation member 117. The four restraint bodies 118e, 118f, 118g, and 118h are located at different positions in the axis N direction, and the restraint body 118*e*, the restraint body 118*f*, the restraint body 118*g*, the restraint body 118*h* are arranged in this order from the heart base portion 116 side toward the heart apex portion 114. Further, in the four restraint bodies 118*e*, 118*f*, 118*g*, and 118*h*, the restraint body 118*e* and the restraint body 118*g* are at the same location in the circumferential direction of the ventricle formation member 117, and the restraint body 118*f* and the restraint body 118*h* are arranged at positions opposing to the restraint body 118*e* and the restraint body 118*g*. As a result, when viewed from the axis N direction, configuration is that the restraint body 118*e* and the restraint body 118*f*, and the restraint body 118*g* and the restraint body 118*h* spirally wind around the outside of the ventricle formation member 117 by about one turn. Other parts of the configuration are similar to those of the first embodiment, and thus, description thereof will be omitted.

According to the above-described heart model 110E of the sixth embodiment, the shape of the restraint body is not limited to a spiral shape. If the restraint body 118 includes a plurality of the restraint bodies 118, as a whole of the plurality of restraint bodies 118, on the surface of the ventricle formation member 117, the restraint body 118 may suffice to include a portion in which positions in the axis N direction are different from each other and a position in which the portions in the circumferential direction of the ventricle formation member 117 are different from each other. With such a configuration, when the simulated ventricle is expanded, it is possible to generate a twist in the ventricle formation member 117 by regulating deformation of the ventricle formation member 117 by the restraint body 118. In the four restraint bodies 118*e*, 118*f*, 118*g*, and 118*h* of the sixth embodiment, a whole of the four restraint bodies 118*e*, 118*f*, 118*g*, and 118*h* are at different locations in the axis N direction and the number of windings (number of rotations) is one rotation or more, and thus, the four restraint bodies 118*e*, 118*f*, 118*g*, and 118*h* include a position in which the portions in the circumferential direction of the ventricle formation member 117 are different from each other. Therefore, even with the restraint bodies 118*e*, 118*f*, 118*g*, and 118*h* of the sixth embodiment, the deformation of the ventricle formation member 117 is regulated to generate a twist in the ventricle formation member 117.

Seventh Embodiment

Figure 18:
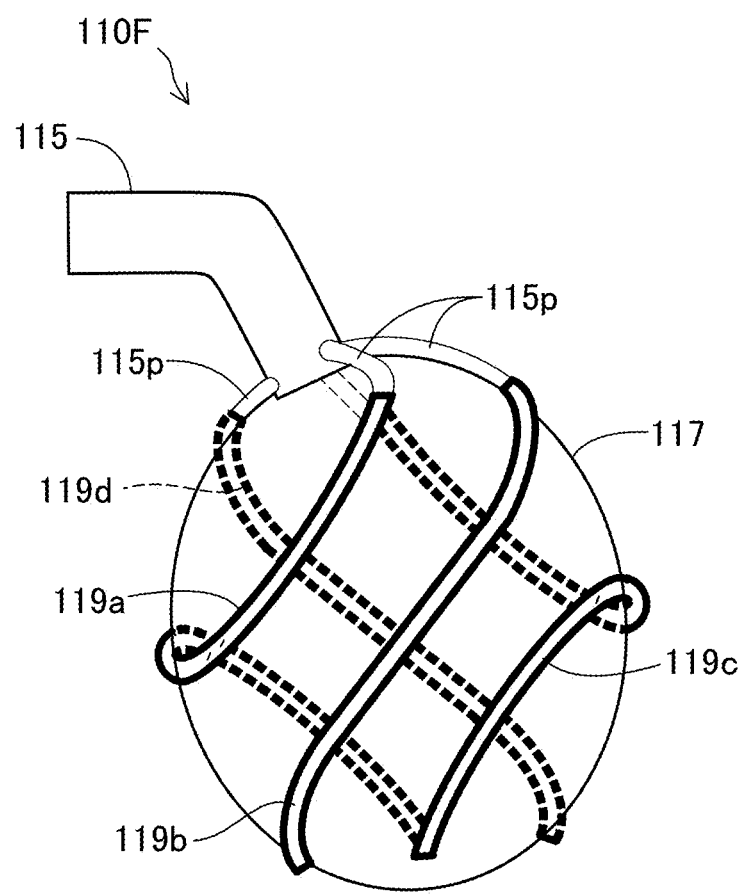
FIG. 18 is a diagram for explaining a heart model according to a seventh embodiment.

FIG. 18 is a diagram for explaining a heart model 110F of a seventh embodiment. In FIG. 18, only the ventricle formation member 117 and restraint bodies 119*a*, 119*b*, 119*c*, and 119*d* of the heart model 110F are illustrated, and the cardiac muscle formation member 113 and the coronary artery model 112 are not illustrated. The heart model 110F of the seventh embodiment is different from the heart model 110 (FIG. 7) of the first embodiment in configuration of the restraint body, the number thereof, and the number of windings thereof. In the heart model 110F of the seventh embodiment, the four restraint bodies 119 (119*a*, 119*b*, 119*c*, and 119*d*) are arranged outside the ventricle formation member 117. Each of the restraint bodies 119 has a configuration where the restraint body 119 spirally wind on about half of the circumference on the outside of the ventricle formation member 117. The four restraint bodies 119 are arranged side by side at substantially equal intervals in the circumferential direction of the ventricle formation member 117. Each of the four restraint bodies 119 is an elongated balloon-shaped member having an inner cavity, and is formed of a natural rubber or a resin. In the restraint body 119, an opening communicating with the inner cavity is connected to the proximal end 115*p* of the tubular body 115. The four restraint bodies 119 can be expanded and contracted by a fluid being supplied and suctioned through the tubular body 115.

Figure 19:
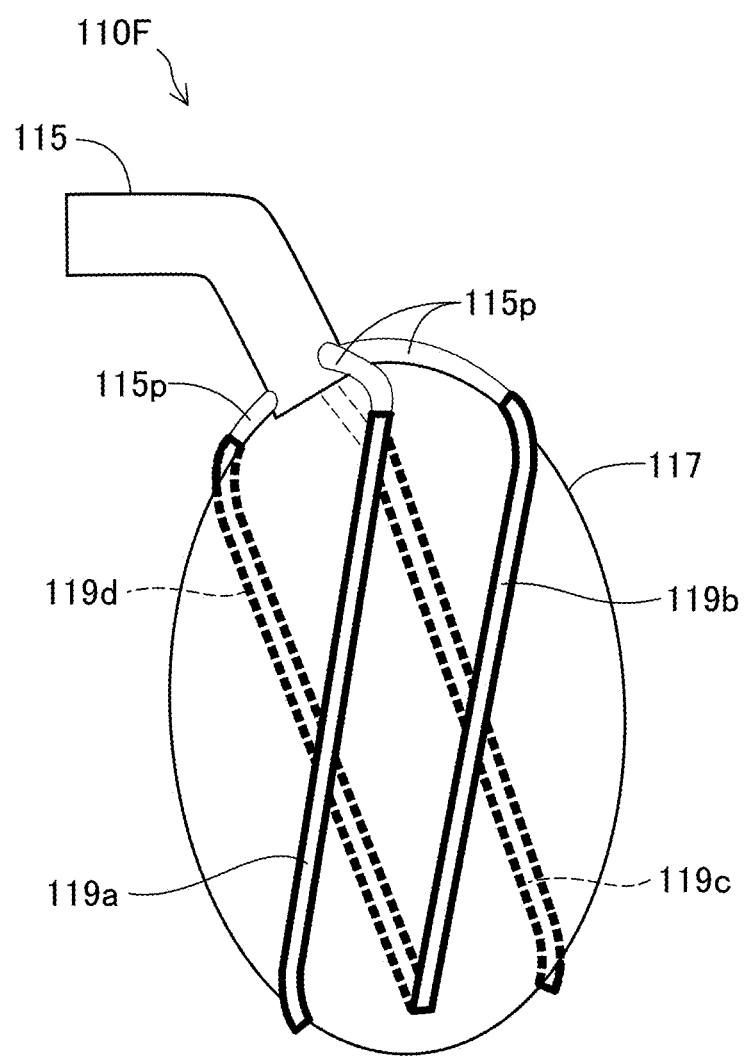
FIG. 19 is a diagram for explaining a state of a ventricle formation member when a restraint body is expanded.

FIG. 19 is a diagram for explaining a state of the ventricle formation member 117 and the restraint body 119 when the restraint body 119 is expanded. When the inner cavity of the restraint body 119 is pressurized, the outer shape of the restraint body 119 bears a resemblance to a linear shape from a spiral shape. At this time, the ventricle formation member 117 follows the deformation of the restraint body 119, and a relative position of the ventricle formation member 117 between the heart base portion 116 side and the heart apex portion 114 side is displaced, causing a twist. When the restraint body 119 is contracted, the outer shape of the restraint body 119 again bears a resemblance to the spiral shape again from the linear shape. At this time, the ventricle formation member 117 follows the restraint body 119 returning to the spiral shape, and the twist is eliminated.

According to the above-described heart model 110F of the seventh embodiment, the restraint body is not limited to the member that regulates the deformation of the ventricle formation member 117. For example, as in the heart model 110F of the seventh embodiment, the restraint body 119 may include the inner cavity, and generate a twist in the ventricle formation member 117 by pressurizing the inner cavity. With such a configuration, it is possible to generate a twist during expansion and contraction with a simple configuration as in the heart model 110F.

Eighth Embodiment

Figure 20:
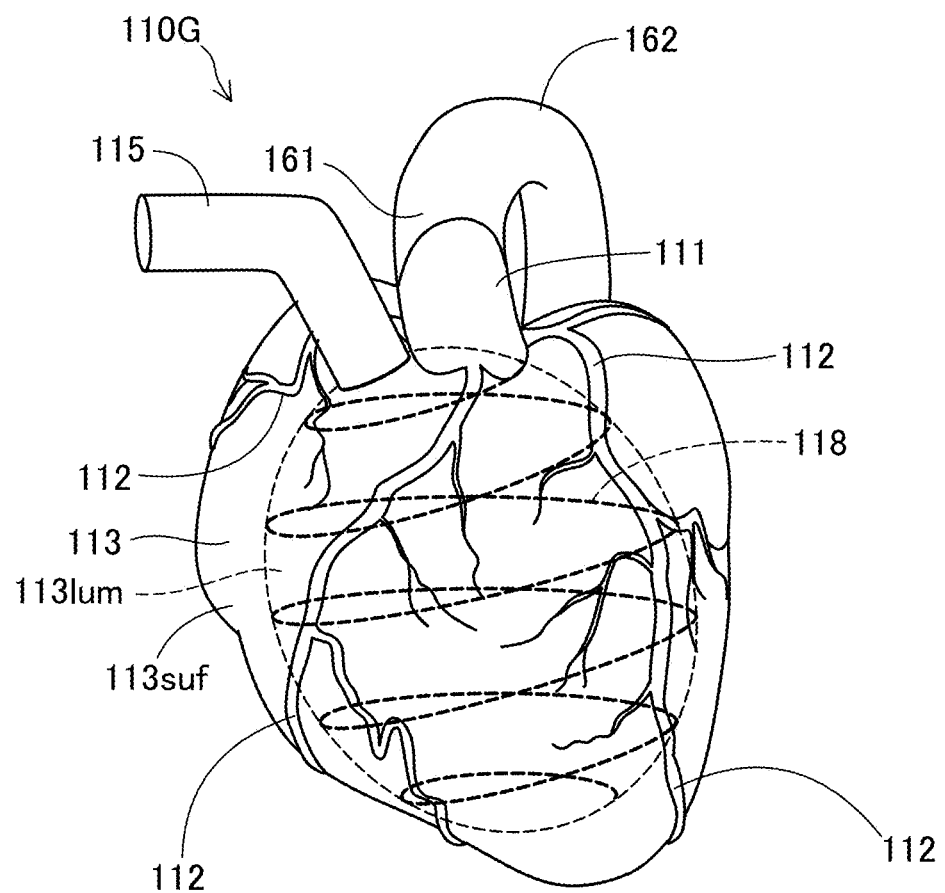
FIG. 20 is a diagram for explaining a heart model according to an eighth embodiment.

FIG. 20 is a diagram for explaining a heart model 110G of an eighth embodiment. The heart model 110G of the eighth embodiment is different from the heart model 110 of the first embodiment (FIG. 7) in that the former does not include the ventricle formation member 117. In the heart model 110G of the eighth embodiment, a hollow simulated ventricle 113*lum* is formed inside the cardiac muscle formation member 113. That is, in the eighth embodiment, the cardiac muscle formation member 113 also functions as a ventricle formation member. The simulated ventricle 113*lum* communicates with the tubular body 115, and can expand and contract by a fluid being supplied and suctioned through the tubular body 115. The restraint body 118 is arranged inside the simulated ventricle 113*lum*. The restraint body 118 has a configuration similar to that of the first embodiment, and is formed by a clockwise spiral wire. The restraint body 118 is entirely in contact with an inner surface of the simulated ventricle 113*lum* to fix a whole of the restraint body 118. According to the configuration, when the simulated ventricle 113*lum* is expanded, it is possible to further regulate the uniform expansion of the simulated ventricle 113*lum* by the restraint body 118. This allows the heart model 110G to generate a twist during expansion and contraction.

According to the above-described heart model 110G of the eighth embodiment, the heart model need not include the ventricle formation member 117. For example, as in the heart model 110G of the eighth embodiment, even when the restraint body 118 is arranged in the simulated ventricle 113*lum* formed by the cardiac muscle formation member 113, it is possible to further regulate the uniform expansion of the simulated ventricle 113*lum* by the restraint body 118 when the simulated ventricle 113*lum* is expanded. As described above, even with a simple configuration as in the heart model 110G, it is possible to generate a twist during expansion and contraction.

<Modification of Present Embodiment>

The disclosed embodiments are not limited to the above-described embodiments, and may be implemented in various modes without departing from the spirit of the disclosed embodiments. The following modifications can be applied, for example.

[First Modification]

FIGS. 21(A) to 21(F) are diagrams each explaining a heart model of a first modification. FIG. 21(A) is a cross-sectional view illustrating a part of the cardiac muscle formation member 113, the ventricle formation member 117, and the restraint body 118 of the heart model 110 (FIG. 7) of the first embodiment. A left side of FIG. 21(A) illustrates the simulated ventricle 117lum inside the ventricle formation member 117. It is assumed that the restraint body 118 (FIG. 7) of the first embodiment is entirely in contact with the ventricle formation member 117. However, as in a heart model 110H illustrated in FIG. 21(B), at least a portion of the restraint body 118 may not be in contact with the ventricle formation member 117. Even in this case, the restraint body 118 can generate a twist in the ventricle formation member 117 when the ventricle formation member 117 is expanded.

Further, the restraint body 118 of the first embodiment is assumed to be formed by a wire having a circular cross section. However, the cross section of the restraint body 118 is not limited to a circular shape and may have any shape. For example, as in a heart model 110J illustrated in FIG. 21(C), the cross section of a restraint body 118J may be semicircular. Further, as in a heart model 110K illustrated in FIG. 21(D), a restraint body 118K may be hollow or may have a rectangular cross section.

Further, it is assumed that the restraint body 118 of the first embodiment is formed of a material different from that of the ventricle formation member 117. However, the restraint body 118 may be formed of the same material as the ventricle formation member 117, or may be integrally formed with the ventricle formation member 117. For example, as in a heart model 110L illustrated in FIG. 21(E), a spiral protrusion 117pro may be formed on the surface of a ventricle formation member 117L. Even in this case, when the ventricle formation member 117L is expanded, there is a difference in deformation amount (level of expansion and deformation) between a portion with the protrusion 117pro and a portion without the protrusion 117pro, and thus, a twist can be generated in the ventricle formation member 117L. Further, as in a heart model 110M illustrated in FIG. 21(F), instead of the restraint body, a spiral recess 117re may be formed on the surface of a ventricle formation member 117M. Even in this case, when the ventricle formation member 117L is expanded, there is a difference in deformation amount between a portion formed with the recess 117re and a portion without the recess 117re, and thus, a twist can be generated in the ventricle formation member 117M.

[Second Modification]

FIGS. 22(A) to 22(F) are diagrams each explaining a heart model of a second modification. FIG. 22(A) is a cross-sectional view illustrating a part of the cardiac muscle formation member 113, the simulated ventricle 113lum, and the restraint body 118 of the heart model 110G (FIG. 20) of the eighth embodiment. A left side of FIG. 22(A) illustrates the simulated ventricle 113lum inside the ventricle formation member 117. It is assumed that the restraint body 118 (FIG. 20) of the eighth embodiment is entirely in contact with the inner surface of the simulated ventricle 113lum. However, as in a heart model 110N illustrated in FIG. 22(B), a part of the restraint body 118, rather than a whole of the restraint body 118, may be contacted and/or fixed to the inner surface of the simulated ventricle 113lum. Even in this case, the restraint body 118 can generate a twist in the cardiac muscle formation member 113 when the simulated ventricle 113lum is expanded.

Further, it is assumed that the restraint body 118 of the eighth embodiment is formed by a wire having a circular cross section. However, the cross section of the restraint body 118 is not limited to a circular shape and may have any shape. For example, as in a heart model 110P illustrated in FIG. 22(C), a cross section of a restraint body 118P may be semicircular. Further, as in a heart model 110Q illustrated in FIG. 22(D), a restraint body 118Q may be hollow or may have a rectangular cross section.

Further, it is assumed that the restraint body 118 of the eighth embodiment is formed of a member different from the cardiac muscle formation member 113. However, the restraint body 118 may be formed of the same member as the cardiac muscle formation member 113, or may be integrally formed with the cardiac muscle formation member 113. For example, as in a heart model 110R illustrated in FIG. 22(E), a spiral protrusion 113pro may be formed on the inner surface of a cardiac muscle formation member 113R. Even in this case, when the cardiac muscle formation member 113R is expanded, there is a difference in deformation amount (level of expansion and deformation) between a portion with the protrusion 113pro and a portion without the protrusion 113pro, and thus, a twist can be generated in the cardiac muscle formation member 113R. Further, as in a heart model 110S illustrated in FIG. 22(F), instead of the restraint body, a spiral recess 113re may be formed on the surface of cardiac muscle formation member 113S. Even in this case, when the cardiac muscle formation member 113S is expanded, there is a difference in deformation amount between a portion formed with the recess 113re and a portion without the recess 113re, and thus, a twist can be generated in the cardiac muscle formation member 113S.

[Third Modification]

In the first embodiment, the restraint body 118 is partially fixed to the ventricle formation member 117 at the fixation portion FP. However, a whole of the restraint body 118 may or may not be fixed to the ventricle formation member 117. Even in these cases, the restraint body 118 can generate a twist in the ventricle formation member 117 when the ventricle formation member 117 is expanded.

[Fourth Modification]

In the first to fifth, seventh, and eighth embodiments, the restraint body 118 has a clockwise spiral shape. However, the restraint body 118 may have a counterclockwise spiral shape. Even in this case, the restraint body 118 can generate a twist in the ventricle formation member 117 when the ventricle formation member 117 is expanded. It is noted that with a clockwise spiral shape, the restraint body 118 more strongly simulates a twist of an actual heart. Further, the restraint body 118 is spirally arranged from the heart base portion 116 toward the heart apex portion 114 on the outside of the ventricle formation member 117. However, the restraint body 118 may be arranged spirally toward other directions. Even in this case, the restraint body 118 can generate a twist in the ventricle formation member 117 when the ventricle formation member 117 is expanded. When arranged spirally from the heart base portion 116 toward the heart apex portion 114 on the outside of the ventricle formation member 117, the restraint body 118 more closely simulates a twist of the actual heart.

[Fifth Modification]

The restraint body 118 illustrated in the first to seventh embodiments is an example, and the shape of the restraint body 118 is not limited thereto. If, on the surface of the ventricle formation member 117, the restraint body 118 may suffice to include a portion in which positions in the axis N direction are different and a position in which the portions in the circumferential direction of the ventricle formation member 117 are different, any shape other than the shape illustrated in the first to seventh embodiments may be acceptable. When the heart apex portion 114 is viewed from the heart base portion 116, the restraint body 118 can generate a strain similar to the heart if the restraint body 118 surrounds the outside of the ventricle formation member 117 by 90 degrees or more e.g., by 180 degrees or more.

Although the aspects have been described based on the embodiments and the modifications, the embodiments of the above-described aspects are for facilitating understanding of the aspects, and do not limit the aspects. The aspects can be modified and improved without departing from the spirit of the aspects and the scope of the claims, and equivalent aspects are included in the aspects. Further, unless the technical features are described as essential in the present specification, it may be omitted as appropriate.

DESCRIPTION OF REFERENCE NUMERALS

1 Human body simulation device
10 Model
20 Accommodation portion
21 Water tank
22 Covering portion
31 Tubular body
40 Control portion
45 Input portion
50 Pulsation portion
51 Tubular body
55 Filter
56 Circulation pump
57 Pulsation pump
60 Cardiac beat portion
61 Tubular body
70 Respiratory movement portion
71, 72 Tubular body
110, 110A to 110K Heart model
111 Cardiovascular model
112 Coronary artery model
113 Cardiac muscle formation member
114 Heart apex portion
115 Tubular body
116 Heart base portion
117 Ventricle formation member
118, 119 Restraint body
120 Lung model
130 Brain model
131 Cerebrovascular model
140 Liver model
141 Hepatic vascular model
150 Lower limb model
151 Lower limb vascular model
160 Aorta model
161 Ascending aorta portion
162 Aortic arch portion
163 Abdominal aorta portion
164 Common iliac artery portion
170 Diaphragm model

The invention claimed is:

1. A heart model, comprising:
a deformable body forming a simulated ventricle therein that can expand and contract; and
a restraint body outside of the simulated ventricle and having a spiral outline around the deformable body, the restraint body regulating deformation of the deformable body to generate a twist in the deformable body when the simulated ventricle expands, wherein the restraint body is formed of a material having a higher rigidity than a material of the deformable body.

2. The heart model according to claim 1, wherein the restraint body surrounds an outside of the simulated ventricle by 180 degrees or more when viewed from an axial direction connecting a heart base and a heart apex of the heart model.

3. The heart model according to claim 2, wherein the restraint body is arranged in a spiral shape from a side of the heart base of the heart model toward a side of the heart apex thereof, outside the simulated ventricle.

4. The heart model according to claim 1, wherein the restraint body includes a plurality of restraint bodies arranged outside the simulated ventricle.

5. The heart model according to claim 1, wherein the restraint body is fixed to the deformable body at a plurality of locations.

6. The heart model according to claim 1, wherein the restraint body surrounds an outside of the simulated ventricle by 180 degrees or more when viewed from an axial direction connecting a heart base and a heart apex of the heart model.

7. The heart model according to claim 6, wherein the restraint body is arranged in a spiral shape from a side of the heart base of the heart model toward a side of the heart apex thereof, outside the simulated ventricle.

8. The heart model according to claim 6, wherein the restraint body includes a plurality of restraint bodies arranged outside the simulated ventricle.

9. The heart model according to claim 1, wherein the restraint body is arranged in a spiral shape from a side of a heart base of the heart model toward a side of a heart apex thereof, outside the simulated ventricle.

10. The heart model according to claim 9, wherein the restraint body includes a plurality of restraint bodies arranged outside the simulated ventricle.

11. The heart model according to claim 1, wherein the restraint body includes a plurality of restraint bodies arranged outside the simulated ventricle.

12. The heart model according to claim 1, wherein the restraint body has a clockwise spiral shape.

13. The heart model according to claim 1, wherein the restraint body is fixed to the deformable body at a plurality of locations.

14. The heart model according to claim 1, wherein the deformable body is balloon-shaped,
the restraint body is arranged on an outer surface of the deformable body, and
the heart model further includes
a cardiac muscle body that forms a simulated cardiac muscle that covers both the deformable body and the restraint body.

15. The heart model according to claim 1, further comprising:
a fluid flow path to supply fluid to an interior of the simulated ventricle to expand the simulated ventricle and remove fluid from the interior of the simulated ventricle to contract the simulated ventricle.

16. The heart model according to claim 1, wherein the restraint body is a hollow wire formed of the material having the higher rigidity than the material of the deformable body.

\* \* \* \* \*